US006215493B1

(12) United States Patent
Fujita

(10) Patent No.: US 6,215,493 B1
(45) Date of Patent: Apr. 10, 2001

(54) THREE-DIMENSIONAL CAD SYSTEM AND METHOD OF CONVERTING TWO-DIMENSIONAL CAD DRAWINGS TO THREE-DIMENSIONAL CAD DRAWINGS

(75) Inventor: Shigehisa Fujita, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/943,277

(22) Filed: Oct. 3, 1997

(30) Foreign Application Priority Data

Oct. 4, 1996 (JP) .................................................... 8-264913

(51) Int. Cl.[7] .................................................... G06T 1/00
(52) U.S. Cl. .................................................... 345/418
(58) Field of Search .................................... 345/418, 419, 345/440, 441

(56) References Cited

U.S. PATENT DOCUMENTS

| | | | |
|---|---|---|---|
| 5,010,502 | * 4/1991 | Diebel et al. | 345/419 |
| 5,561,748 | * 10/1996 | Niu et al. | 345/420 |
| 5,668,939 | * 9/1997 | Numao et al. | 345/427 |

FOREIGN PATENT DOCUMENTS 6-60153   3/1994 (JP) .

OTHER PUBLICATIONS

"Automatic Reconstruction of Solid from a Set of the Orthographical Three Views" System Engineering IEEE International Conference, pp. 229–233, 1992.*

Shanmukh K. et al.—"Volume Intersection With Optimal Set of Directions", Pattern Recognition Letters, vol. 12, No. 3, 12, Mar. 1991, pp. 165–170.

Xingxin Cheng, et al.—"Method of 3D Model Reconstruction from Multi–Views Line Drawings", Transastions of the Institute of Electronics, Information and Communication Engineers of Japan, vol. E73, No. 6, Jun. 1990, pp. 995–1003.

Fatih Ulupinar et al—"Recovery of 3–D Objects With Multiple Curved Surfaces From 2–D Contours", Proceedings of the Computer Society COnference on Computer Vision and Pattern Recognition, Champaign, IL, Jun. 15–18 1992, Jun. 15, 1992, pp. 730–733.

Zen Chen et al.—"Automatic Reconstruction of 3D Solid Objects from 2D Orthographic Views", Pattern Recognition, vol. 21, No. 5, 1988, pp. 439–449.

Katsuhiro Katajima et al.,—"Reconstruction of GSC Solid from a Set of Orthographic Three Views", Proceedings of the International Conference on Systems Engineering, Kobe, Sep. 17–19, Sep. 17, 1992, pp. 220–224.

Qing–Wen Yan et al—"Efficient Algorithm for the Reconstruction of 3D Objects from Orthographic Projections", Computer Aided Design, vol. 26, No. 9, Sep. 1994, pp. 699–717.

Gujar U G et al.—"Construction of 3D Solid Objects from Orthographic Views", Computers and Graphics, vol. 13, No. 4, Jun. 1, 1989, pp. 505–521.

* cited by examiner

*Primary Examiner*—Mark R. Powell
*Assistant Examiner*—Thu Nguyen

(57) ABSTRACT

To dramatically shorten the time for making three-dimensional CAD drawings from two-dimensional CAD drawings and simplify inputting work to be carried out by operators, a data reading unit reads two-dimensional CAD data made by a two-dimensional CAD system, a figure allotting unit allots a plurality of figures formed of read-in two-dimensional CAD data to at least two reference planes, an outermost contour line extracting unit extracts outermost contour lines for each figure occurring at the reference planes allotted to the figures, a solid element making unit constructs solid elements for shapes extending in a direction of normal to reference planes corresponding to the extracted outermost contour lines and a solid element synthesizing unit synthesizes the constructed plurality of solid elements so as to make three-dimensional CAD data based on the two-dimensional CAD data.

7 Claims, 22 Drawing Sheets

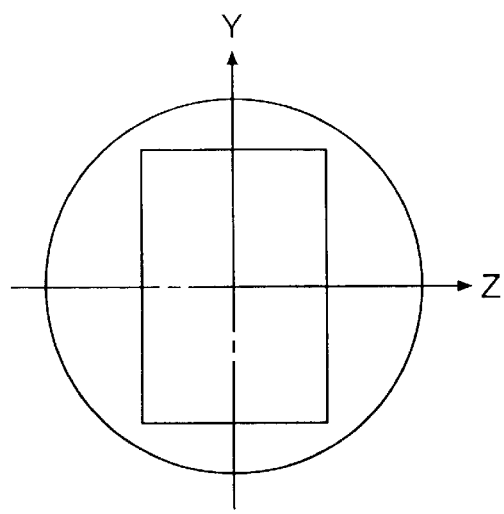
FIG. 6A
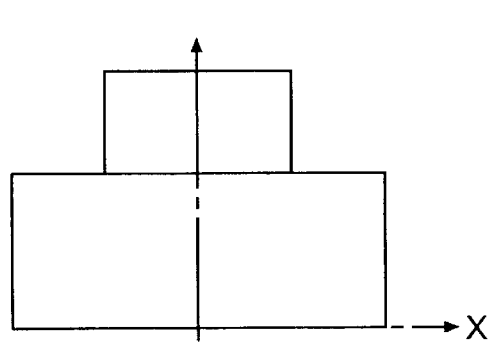 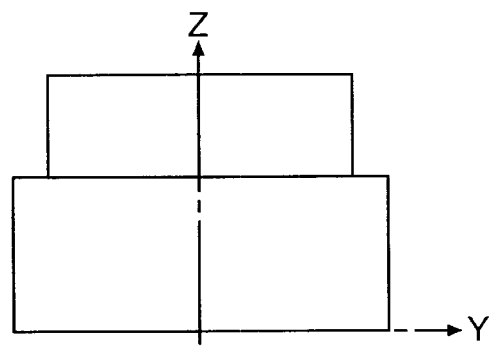
FIG. 6B   FIG. 6C

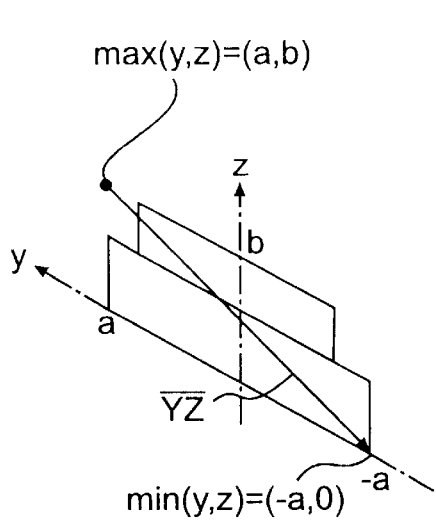
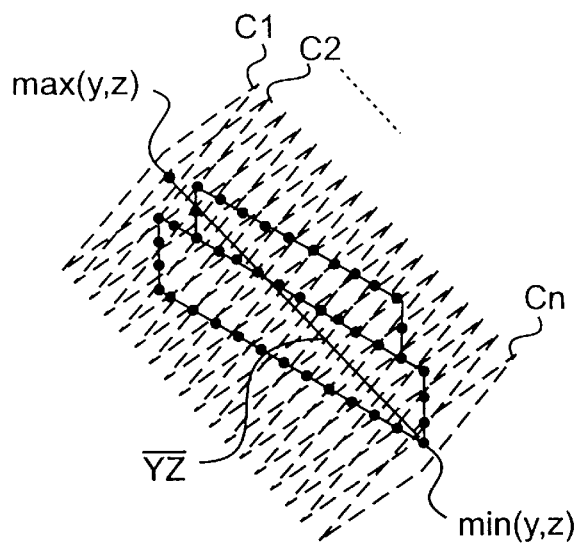
FIG. 11A  FIG. 11B
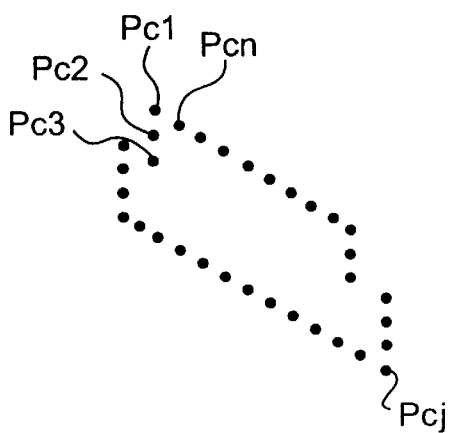
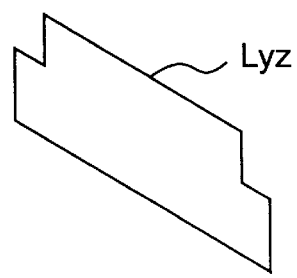
FIG. 11C  FIG. 11D

THREE-DIMENSIONAL CAD SYSTEM AND METHOD OF CONVERTING TWO-DIMENSIONAL CAD DRAWINGS TO THREE-DIMENSIONAL CAD DRAWINGS

FIELD OF THE INVENTION

The present invention relates to a three-dimensional CAD system and method of converting two-dimensional drawings to three-dimensional drawings. With the present invention, three-dimensional CAD drawings (solid views) of various shapes can be easily made based on two-dimensional CAD data recorded as a two-dimensional CAD drawing.

BACKGROUND OF THE INVENTION

Three-dimensional CAD drawings are solid views which have several advantages over two-dimensional CAD drawings in that contours of product shapes can be recognized at a glance and product shapes can be easily understood.

Conventionally, the following labor-intensive work has been performed out to convert two-dimensional CAD drawings drawn isometrically to three-dimensional CAD drawings.

(1) Print a two-dimensional CAD drawing with dimensions that has been previously entered.

(2) Pick-up the dimensions from the printed two-dimensional CAD drawing by hand.

(3) Ridges and peaks relating to the dimensions that have been picked up are then inputted by hand onto three-dimensional axes of a grid drawn onto a monitor connected to the CAD system. Spline interpolation is then carried out with respect to a curved plane.

Three-dimensional CAD data corresponding to the two-dimensional CAD drawings is then obtained by drawing three-dimensional CAD drawings (solids) on the monitor using the aforementioned procedure.

In another conventional method, three-dimensional shapes of products are completed by inputting two-dimensional CAD drawings to planes in three dimensions and performing a transition in the third dimension direction.

However, in this conventional method of converting to a three-dimensional CAD drawing, the dimensions are read-in by inspection and a method of working where inputting is carried out by designating ridges and peaks corresponding to the read-in dimensions on a screen using a pointing device (coordinate input device such as a mouse etc.) is performed. Therefore, even in the case of a simple part such as a part for a motorcycle, the time required for inputting this information to construct a three-dimensional CAD drawing from a two dimensional CAD drawing is substantial. Furthermore, it is necessary to consider the likelihood of input mistakes and their effect on the three-dimensional drawing. Also, there are a large number of processes to make such a three-dimensional CAD drawing. The practical result is that three-dimensional CAD drawings can only be obtained for a limited number of products.

Therefore, in the related art, a three-dimensional figure data generating method has been proposed (for example, refer to Japanese Patent Laid-open Publication No. Hei. 6-60153) capable of automatically generating a solid model realizing the three-dimensional shape of an object from two-dimensional CAD drawings drawn in three planes.

This conventional method of generating three-dimensional figure data is suitable for generating three-dimensional figure data based on, for example, two-dimensional figure data relating to an orthogonal XYZ coordinate system, i.e. data relating to plane shapes of objects, data relating to front shapes of objects or data relating to side shapes of objects. However, in the case where figure data relating to planes of other coordinate systems, for example, figure data relating to planes taking an axis at a position that is skewed with respect to the orthogonal XYZ axes or figure data relating to partially projected views (section views) where an object is viewed from an arbitrary direction is included, concave closed loop processes or assistance line processing and concealed line processing becomes difficult, with further complications resulting from the bulkiness of attribute information are also possible.

The input work for this kind of conversion to a three-dimensional CAD drawing is inefficient. Furthermore, the amount of work for the CAD operators and the operation processing steps in the program are constantly increasing. Therefore, when servicing the working environment and system maintenance etc. are considered, there is a demand for a three-dimensional CAD system and a method for converting two-dimensional CAD drawings to three-dimensional CAD drawings capable of both alleviating the amount of work for the operators and shortening the operation time as well as reducing the operation processing steps of the program regardless of the kind of two-dimensional figure data.

SUMMARY AND OBJECT OF THE INVENTION

It is an object of the present invention to solve the above-mentioned problems.

It is another object of the present invention to provide a three-dimensional CAD system and method of converting from two-dimensional CAD drawings to three-dimensional CAD drawings capable of dramatically shortening the time for making three-dimensional CAD drawings from two-dimensional CAD drawings and simplifying both the inputting work for CAD operators and the operation processing of the program regardless of the kind of two-dimensional figure data.

The three-dimensional CAD system is therefore configured with a data reading unit for reading two-dimensional CAD data made by a two-dimensional CAD system, a figure allotting unit for allotting a plurality of figures formed of read-in two-dimensional CAD data to at least two reference planes, an outermost contour line extracting unit for extracting outermost contour lines for each figure occurring at the reference planes allotted to the figures, a solid element making unit for making solid elements for shapes extended in a direction normal to the reference planes corresponding to the extracted outermost contour lines, and a solid element synthesizing unit for synthesizing made plurality of solid elements so as to make three-dimensional CAD data based on the two-dimensional CAD data.

In this way, two-dimensional data made by the two-dimensional CAD system is first read-into the three-dimensional CAD system via the data reading unit. The plurality of figures formed for this read-in binary CAD data are then allotted to at least two reference planes via the figure allotting means. Namely, the two-dimensional CAD data is figure data obtained by making the product shape conform to various technical drawings. This therefore typically includes, for example, figure data conformed to the plane shape, front shape and side shape of a product; figure data relating to planes occurring on other coordinate systems or figure data relating to planes taking an axis that is skewed with respect to, for example, the XYZ axes as a normal.

Therefore, in, for example, the case of using the figure allotting unit, two-dimensional CAD data relating to the plane shape of the product would be allotted as figure data taking, for example, the xy plane as a reference plane, the two-dimensional CAD data relating to the front shape of the product would be allotted as shape data taking the xz plane as a reference plane, and two-dimensional CAD data relating to the side shape of the product would be taken as shape data taking, for example, the yz plane as a reference plane.

Further, in addition to figure data relating to the xy plane, yz plane and xz-plane occurring in the orthogonal XYZ coordinate system, the figure allotting unit also carries out allotting for figure data relating to, for example, planes taking an axis skewed with respect to the orthogonal XYZ axis as a normal and for figure data relating to section views where a certain product is viewed from an arbitrary direction. In this case, the respective reference planes correspond to planes taking an axis at a skewed position as a normal and, for section views, planes taking the direction of projection as a normal.

The outermost contour lines (outer shape lines) of the respective shapes for each reference plane are then extracted via the outermost contour line extracting unit based on the shape data allotted to each reference plane. Lines for detailed parts included in the outermost contour lines such as, for example, circular lines indicating holes or lines indicating projections are deleted at this extracting stage, with just the visible outline being extracted.

Solid elements of shapes extended along the normals of the reference planes corresponding to the extracted outermost contour lines are then made via the solid element making unit. Specifically, with the outermost contour line relating to the plane shape, the reference plane is, for example, the xy plane. Therefore, by extending the outermost contour line along the z axis, the plane shape formed by the outermost contour line is taken as the crossover plane and a cylindrical solid element (hereinafter referred to simply as a "first solid element") taking its axial direction as the z axis is made.

Further, the reference plane for the outermost contour line relating to the front shape is the xz plane. Therefore, the plane shape formed by the outermost line is taken as the crossover plane by extending the outermost contour line along the y axis and a cylindrical solid element (hereinafter referred to simply as a "second solid element") taking the direction of the y-axis as its axial direction is formed.

Moreover, the reference plane for the outermost contour line relating to the side shape is the yz plane. Therefore, the plane shape formed by the outermost line is taken as the crossover plane by extending the outermost contour line along the x axis and a cylindrical solid element (hereinafter referred to simply as a "third solid element") taking the direction of the x-axis as its axial direction is formed.

Regarding outermost contour lines for figure data relating to planes taking an axis skewed with respect to the orthogonal XYZ axis as a normal, the outmost contour line is extended along the normal direction and the plane shape formed by the outermost contour line is taken as a crossover plane so that a cylindrical solid element taking its axial direction to be the aforementioned normal direction is made.

Regarding the outermost contour lines for figure data relating to section views, the outermost contour line is extended along the direction of projection and the plane shape formed by the outermost contour line is taken to be a crossover plane so that a cylindrical solid element taking the direction of projection as its axial direction is made.

Next, all of the solid elements including the first to third solid elements are synthesized via the solid element synthesizing unit, just, for example, the logical product is computed or computations that are combinations of the logical product and logical sum are carried out, and three-dimensional data, which in this case is three-dimensional data showing only the external shape, is made based on the two-dimensional CAD data.

Lines for detailed parts erased by outermost contour line extraction processing at the outermost contour line extraction processing unit such as, for example, circular lines for holes or lines for projections etc. are then added to the three-dimensional CAD data for the shape so as to take orientation of the product taken to be a solid into consideration. This additional operation can be finished in a short period of time because the circular lines for holes and the lines for projections etc. are extremely simple.

In the three-dimensional CAD system relating to the present invention, a plurality of solid elements are made by cylindrically extending outermost contour lines occurring at each of the reference planes for the two-dimensional CAD data, with this plurality of solid elements then being synthesized to make three-dimensional CAD data. Solid drawings for shapes that take up the longest amount of time can therefore be made automatically without an operator inputting any data or with an operator inputting a minimum of data so that the amount of work to be done by an operator and the operation time can both be reduced by a factor of nine.

Simple operation processing can also be carried out in the case where, in addition to two-dimensional CAD data relating to orthogonal XYZ coordinate systems, figure data relating to planes taking, for example, an axis in a position skewed with respect to the orthogonal XYZ axes as a normal or figure data relating to partial projection views (section views) where a product is viewed from an arbitrary direction is included. This means that the number of program steps can be reduced and is extremely useful with regards to system maintenance.

This therefore eliminates difficulties with respect to CAD operations (this also includes the awareness of difficulty as well as the difficulty of the operations themselves) and provides an increase in the utilization factor of CAD systems as well as dramatic progress as regards to the development of three-dimensional design systems for automobiles, motorcycles and for construction, shipbuilding and electronic equipment, etc.

Therefore, with the above configuration, there may be provided as the outermost contour line extracting unit, a figure projection unit for projecting the two-dimensional CAD data read by the data reading unit at a reference plane allotted by the figure allotting unit, maximum/minimum operation unit for calculating maximum and minimum coordinate values which projected figures can take with respect to respective reference planes, line segment operation unit for obtaining line segments linking maximum coordinate values and minimum coordinate values obtained for each reference plane, plane generating unit for generating, with regards to each reference plane, a plurality of planes perpendicular to the obtained line segments every reference plane, crosspoint extracting unit for repeating a cycle of obtaining a crosspoint of one generated plane and a projected view corresponding to the reference plane and extracting two points furthermost from this crosspoint, for the generated plurality of plane portions and outermost contour making unit for, for each reference plane, making a single contour line by linking crosspoints extracted by the crosspoint extracting unit using straight lines and taking this as the outermost contour line of each reference plane.

In this way, the two-dimensional CAD data is projected at reference planes allotted by the figure allotting unit via the figure projection means. For example, the plane shape of the product is projected at the xy plane, the front shape of the product is projected at the xz plane and the side shape of the product is projected at the yz plane. Figure data relating to planes taking axes in positions that are skewed with respect to the orthogonal XYZ coordinates as normals and figure data relating to section views can be similarly projected from corresponding reference planes.

After this, the maximum/minimum operation unit calculates maximum and minimum-coordinate values which projected figures can take with respect to respective reference planes. Line segments linking the obtained maximum coordinate values and the minimum coordinate values are then obtained for each reference plane via the line segment operation unit. Further, a plurality of planes at right-angles to the obtained line segments are then generated each reference plane for each reference plane via the plane generating unit. Crosspoints for one of the generated planes and a projected view corresponding to the reference plane are then obtained for each reference plane via the crosspoint extracting unit and a cycle of extracting the furthermost two points from this crosspoint is then repeated for the plurality of generated plane portions via the crosspoint extracting unit.

A single curved contour line is then made by linking crosspoints extracted by the crosspoints extracted by the crosspoint extracting unit for each reference plane via the outermost contour making unit, with this being taken as the outermost contour line occurring at this reference plane.

The outermost contour lines occurring at each reference plane of the product are then made to be a single contoured curve including a plurality of linked straight lines as a result of the processing operations at each of the various units. This makes processing for making solid elements at the solid element making unit and synthesis processing at the solid element synthesizing unit simple. It is therefore possible to make a solid view of the product rapidly with fewer program steps and the program capacity can be reduced.

Further, a method of converting two-dimensional CAD drawings to three-dimensional CAD drawings is characterized by allotting a plurality of figures formed of two-dimensional data made using a two-dimensional CAD system to at least two reference planes, making solid elements of shapes that are extended in the direction of a normal of a reference plane corresponding to an outermost contour line of each figure occurring at the reference planes that the figures are allotted to and synthesizing made plurality of solid elements and making three-dimensional CAD data based on the two-dimensional CAD data.

In this case, a plurality of solid elements where the outermost contour lines occurring at each of the reference planes for the two-dimensional data are cylindrically extended are made and three-dimensional CAD data is then made by synthesizing this plurality of solid elements. Solid views of external shapes that take up the most time can then be automatically made without any data input from the operator or with a minimum of data input, with this reducing the work to be done by the operator and the operation time by a factor of 9.

Next, a method of converting two-dimensional CAD drawings to three-dimensional CAD drawings is characterized by a data reading step of reading two-dimensional CAD data made by a two-dimensional CAD system, a figure allocation step of allotting a plurality of figures formed of read-in two-dimensional CAD data to at least two reference planes, an outermost contour line extracting step of extracting outermost contour lines for each figure occurring at the reference planes allotted to the figures, a solid element making step of making solid elements for shapes extended in directions normal to the reference planes corresponding to the extracted outermost contour lines and a solid element synthesizing step of synthesizing made plurality of solid elements and making three-dimensional CAD data based on the two-dimensional CAD data.

In this way, the two-dimensional CAD data made by the two-dimensional CAD system is read-into the three-dimensional CAD system by the data reading step. The plurality of figures formed by this read-in two-dimensional CAD data are then allotted to at least two reference planes by the process in the figure allotting step. Namely, the two-dimensional CAD data is figure data obtained by making the product shape conform to various technical drawings. This therefore typically includes, for example, figure data conformed to the plane shape, front shape and side shape of a product, figure data relating to planes occurring on other coordinate systems or figure data relating to planes taking an axis that is skewed with respect to, for example, the XYZ axes as a normal.

In the case of carrying out processing for, for example, the figure allotting step, two-dimensional CAD data relating to the plane shape of the product is allotted as shape data taking, for example, the xy plane as a reference plane, two-dimensional CAD data relating to the front shape of the product is allotted as shape data taking the xz plane as a reference plane and two-dimensional CAD data relating to the side shape of the product is allotted as shape data taking, for example, the yz plane as a reference plane.

Further, at the shape allotting unit, in addition to shape data relating to the xy plane, yz plane and xz plane occurring in the orthogonal XYZ coordinate system, allotting is also carried out for figure data relating to planes taking an axis that is skewed with respect to the orthogonal XYZ axis as a normal and figure data relating to section views where a product is viewed from an arbitrary direction. In this case, the reference planes correspond to planes taking an axis in a skewed-position as a normal and section views taking the direction of projection as a normal.

The outermost contour lines (external shape lines) for the shapes for each reference plane are extracted by the process in the outermost contour line extracting step based on shape data allotted to each reference plane. In this extracting step, lines for detailed parts included in the outermost contour lines such as, for example, circular lines indicating holes or lines indicating projections etc. are deleted, with just the outline being extracted.

After this, solid elements for shapes extended along the normal of the reference plane corresponding to the extracted outermost contour line is made by the process in the solid element making step. Specifically, with the outermost contour line relating to the plane shape, the reference plane is, for example, the xy plane. Therefore, by extending the outermost contour line along the z axis, the plane shape formed by the outermost contour line is taken as the crossover plane and a cylindrical solid element (hereinafter referred to simply as a "first solid element") taking its axial direction as the z axis is made.

Further, the reference plane for the outermost contour line relating to the front shape is the xz plane. Therefore, the plane shape formed by the outermost line is taken as the crossover plane by extending the outermost contour line along the y axis and a cylindrical solid element (hereinafter referred to simply as a "second solid element") taking the direction of the y-axis as its axial direction is formed.

Moreover, the reference plane for the outermost contour line relating to the side shape is the yz plane. Therefore, the plane shape formed by the outermost line is taken as the crossover plane by extending the outermost contour line along the x axis and a cylindrical solid element (hereinafter referred to simply as a "third solid element") taking the direction of the x-axis as its axial direction is formed.

Regarding outermost contour lines for figure data relating to planes taking an axis skewed with respect to the orthogonal XYZ axis as a normal, the outermost contour line is extended along the normal direction and the plane shape formed by the outermost contour line is taken as a crossover plane so that a cylindrical solid element taking its axial direction to be the aforementioned normal direction is made. Regarding the outermost contour lines for figure data relating to section views, the outermost contour line is extended along the direction of projection and the plane shape formed by the outermost contour line is taken to be a crossover plane so that a cylindrical solid element taking the direction of projection as its axial direction is made.

Next, all of the solid elements including the first to third solid elements are synthesized via the solid element synthesizing step, just, for example, the logical product is computed or computations for mixing the logical product and logical sum are carried out, and three-dimensional data which in this case is three-dimensional data showing only the external shape, is made based on the two-dimensional CAD data.

Lines for detailed parts erased by outermost contour line extraction processing in the outermost contour line extraction processing step such as, for example, circular lines for holes or lines for projections etc. are then added to the three-dimensional CAD data for the shape so as to take orientation of the product taken to be a solid into consideration. This addition operation can be finished in a short period of time because the circular lines for holes and the lines for projections etc. are extremely simple.

In the method of converting two-dimensional CAD drawings to three-dimensional CAD drawings relating to the present invention, a plurality of solid elements are made by cylindrically extending outermost contour lines occurring at each of the reference planes for the two-dimensional CAD data, with this plurality of solid elements then being synthesized to make three-dimensional CAD data. Solid drawings for shapes that take up the longest amount of time can therefore be made automatically without an operator inputting any data or with an operator inputting a minimum of data so that the amount of work to be done by an operator and the operation time can both be reduced by a factor of nine.

Simple operation processing can also be carried out in the case where, in addition to two-dimensional CAD data relating to orthogonal XYZ coordinate systems, figure data relating to planes taking, for example, an axis in a position skewed with respect to the orthogonal XYZ axes as a normal or figure data relating to partial projection views (section views) where a product is viewed from an arbitrary direction is included. This means that the number of program steps can be reduced and is extremely useful with regards to system maintenance.

The invention therefore eliminates difficulties with respect to CAD operations (this also includes the awareness of difficulty as well as the difficulty of the operations themselves) and provides an increase in the utilization factor of CAD systems as well as dramatic progress as regards to the development of three-dimensional design systems for automobiles, motorcycles and for construction, shipbuilding and electronic equipment, etc.

In the inventive method, the outermost contour line extracting step includes a figure projection step of projecting the two-dimensional CAD data read in the data reading step at a reference plane allotted in the figure allotting step; a maximum/minimum operation step for calculating maximum and minimum coordinate values which projected figures can take with respect to respective reference plane; a line segment operation step for obtaining line segments linking maximum coordinate values and minimum coordinate values obtained for each reference plane; a plane generating step for generating, with regards to each reference plane, a plurality of planes perpendicular to the obtained line segments every reference plane; a crosspoint extracting step for repeating a cycle of obtaining a crosspoint of one generated plane and a projected view corresponding to the reference plane and extracting two points furthermost from this crosspoint, for the generated plurality of plane portions; and an outermost contour making step that, for each reference plane, makes a single contour line by linking crosspoints extracted in the crosspoint extracting step using straight lines and taking this as the outermost contour line of each reference plane. In this way, the two-dimensional CAD data is projected at reference planes allotted by the figure allotting unit via the figure projection step.

For example, the plane shape of the product is projected at the xy plane, the front shape of the product is projected at the xz plane and the side shape of the product is projected at the yz plane. Figure data relating to planes taking axes in positions that are skewed with respect to the orthogonal XYZ coordinates as normals and figure data relating to section views can be similarly projected from corresponding reference planes.

After this, maximum coordinate values and minimum coordinate values which projected figures can take with respect to respective reference planes are calculated via the maximum/minimum operation step process. Line segments linking the obtained maximum coordinate values and the minimum coordinate values are then obtained for each reference plane via the line segment operation step. Further, a plurality of planes at right-angles to the obtained line segments are then generated each reference plane via the plane generating step process. Crosspoints for one of the generated planes and a projected view corresponding to the reference plane are then obtained for each reference plane via the crosspoint extracting step process and a cycle of extracting the furthermost two points from this crosspoint is then repeated for the plurality of generated plane portions via the crosspoint extracting step process.

A single curved contour line is then constructed by linking crosspoints extracted by the crosspoint extracting step for each reference plane via the outermost contour making step process, with this being taken as the outermost contour line occurring at this reference plane.

The outermost contour lines occurring at each reference plane of the product are then made to be a single contoured curved line including a plurality of linked straight lines as a result of the processing operations at each of the various steps. This simplifies the processing for making solid elements in the solid element making step and synthesis processing in the solid element synthesizing step. It is therefore possible when the various steps are incorporated into software to make a solid view of a product rapidly with fewer program steps thereby reducing the size of the program.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 6A–C are views illustrating the state of allotting of the two-dimensional CAD data for the product to three reference planes by the figure allotting unit, with FIG. 6A showing an example of allotting plane shape data to the xy plane, FIG. 6B showing an example of allotting front shape data to the xz plane, and FIG. 6C showing an example of allotting side shape data to the yz plane;

FIGS. 11A–D are views illustrating the process up to extracting of the outermost contour line from the plane shape data, with FIG. 11A showing an example of projection of the plane shape data at the yz plane, obtaining of maximum and minimum coordinate values on the yz plane which projected views can take, and obtaining of the linking line segment/YZ for the maximum coordinate and the minimum coordinate, FIG. 11B showing an example of generating a plurality of planes at right-angles to the line segment/YZ, FIG. 11C showing an example of obtaining the crosspoints of the plurality of generated planes and the plane shape data and generating of a group of a string of consecutive points, and FIG. 11D showing an example of linking the generated string of consecutive points using straight lines so as to make a single contoured curve (outermost contour line);

DETAILED DESCRIPTION OF THE PREFERRED EMBODIMENTS

The following is a description with reference to the figures briefly described above illustrating the three-dimensional CAD system (hereinafter referred to as simply a three-dimensional CAD system relating to the embodiment) according to the present invention which easily converts from a two-dimensional CAD drawing to a three-dimensional CAD drawing.

Figure 1:
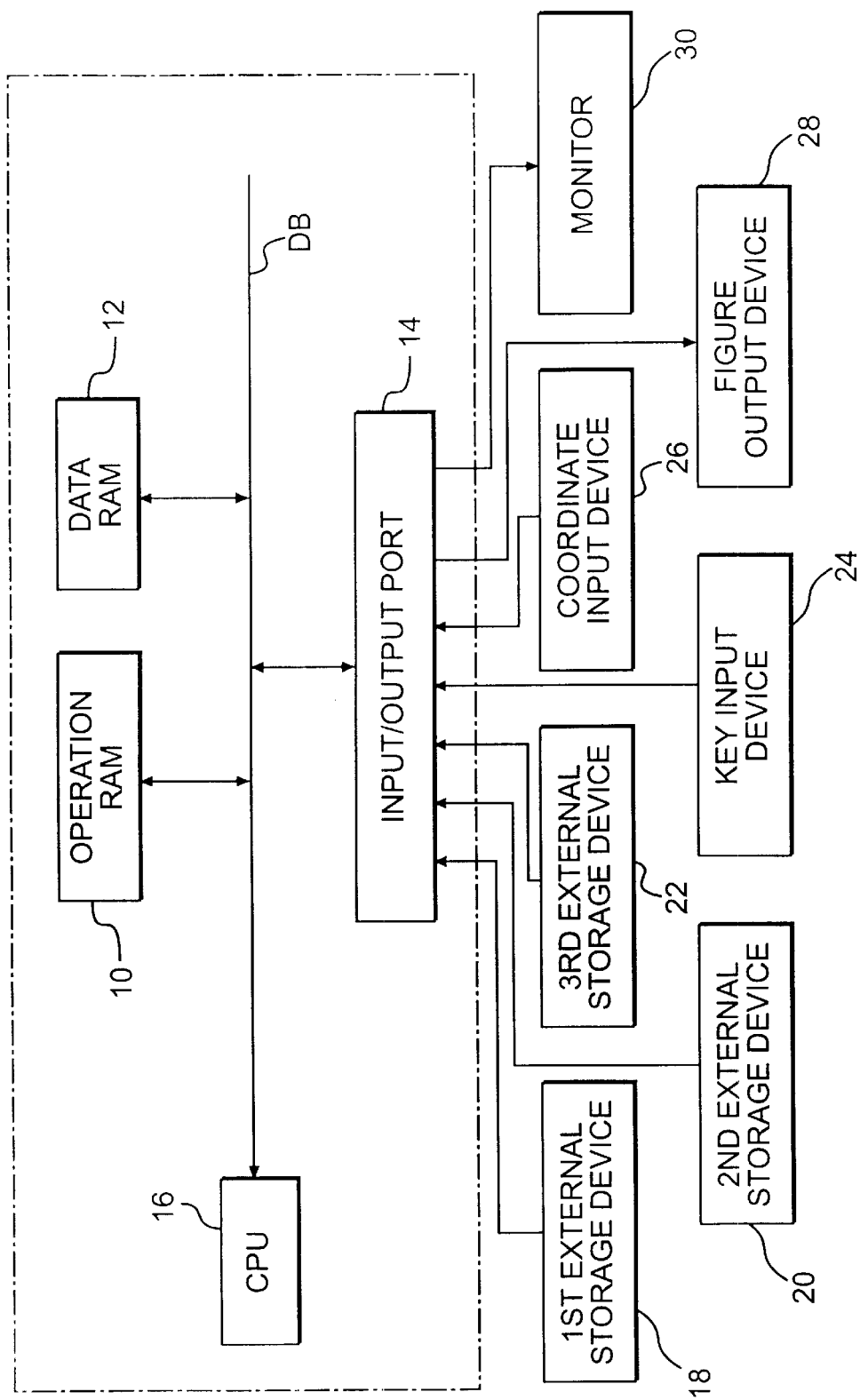
FIG. 1 is a block diagram showing the hardware configuration of an embodiment for the case of converting two-dimensional CAD drawings to three-dimensional CAD drawings (hereinafter referred to simply as the three-dimensional CAD system relating to the embodiment) to which the three-dimensional CAD system relating to the present invention is applied.

As shown in FIG. 1, the three-dimensional CAD system relating to the illustrated embodiment includes an operation RAM 10 used in various program operations, a data RAM 12 for storing data from external equipment and data that has been data-processed by various programs, an input/output port 14 for inputting and outputting data to and from external equipment and a CPU (control device and logic operation device) 16 for controlling these circuits.

Each of these circuits delivers data via a data bus DB, with this being controlled by the CPU 16 via address busses and control busses taken from the CPU 16.

A first external storage device 18 configured from, for example, a hard disc and storing the various data for an OS (operating system), system program and an application program (solid drawing conversion unit), a second external storage device 20 holding an information data base containing various information such as technical drawing regulation information, product materials information, product shape information, the degree of error in views of two planes, designer degree of error and an error table etc., and a third external storage device 22 including an optical disc or hard disc housing a figure data base for storing large amounts of figure data of two-dimensional CAD data and constructed three-dimensional CAD data are connected to the input/output port 14.

Further, key input device 24 (e.g. keyboard), a pointing device that is a coordinate input device 26 including a mouse, light pen, or dial etc. a figure output device 28 (e.g. an XY plotter), and a monitor 30 that is the main device for dialog between the three-dimensional CAD system and the operator and is the display device linking the operation of the key input device 24 and the coordinate input device 26 are also connected to the input/output port 14.

This three-dimensional CAD system is usually configured in such a manner as to be connected to a host computer that is not shown in the drawings via a network, with exchange of data with other CAD systems being carried out via this network.

Next, a description of the processing operation of the three-dimensional CAD system relating to the illustrated embodiment and, in particular, the processing operation for the solid drawing conversion unit (solid drawing conversion program) is described based on the conceptual illustrations of the functional block diagrams and the flowcharts of FIGS. 2–22.

Figure 3:
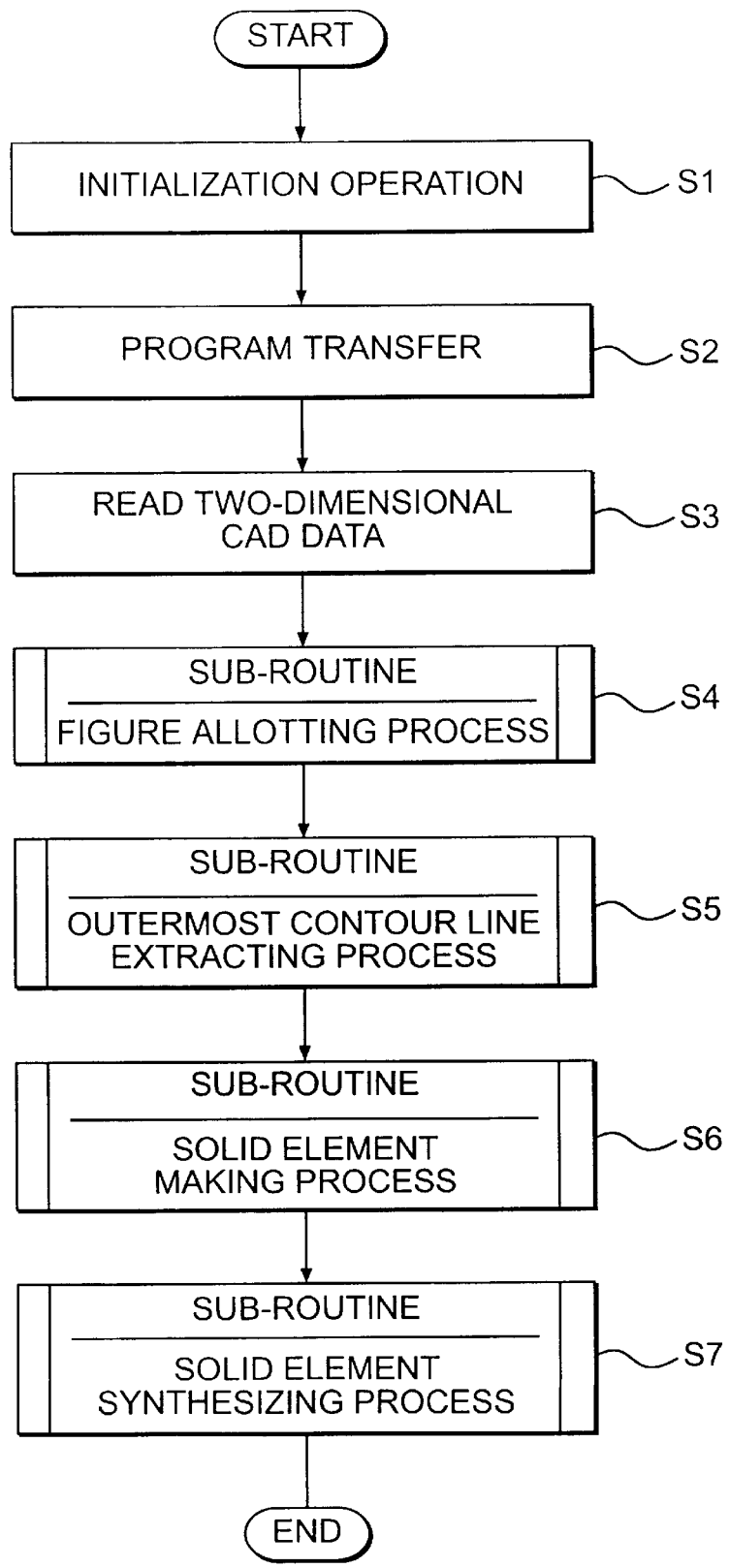
FIG. 3 is a flowchart showing the processing operation for the solid conversion unit.

First, in step S1 of FIG. 3 of the three-dimensional CAD system relating to this embodiment, initialization operations such as, for example, system checks and memory checks within the three-dimensional CAD system and setting up etc. are carried out simultaneously with powering on.

Next, in step S2, the solid drawing conversion unit (solid drawing conversion program) is read-out from the first external storage device 18 and, simultaneously with this being stored in the operation RAM 10, a workspace is allotted within the RAM 10 that is used for temporarily saving data generated during the operation of this program or for delivering parameters between each of the routines comprising the program.

Further, various storage regions and data files made by the solid drawing conversion program are allotted in the data RAM 12.

The solid drawing conversion programs stored at the operation RAM 10 are simultaneously activated upon completion of allocation to each of the various regions of the data RAM 12.

Figure 2:
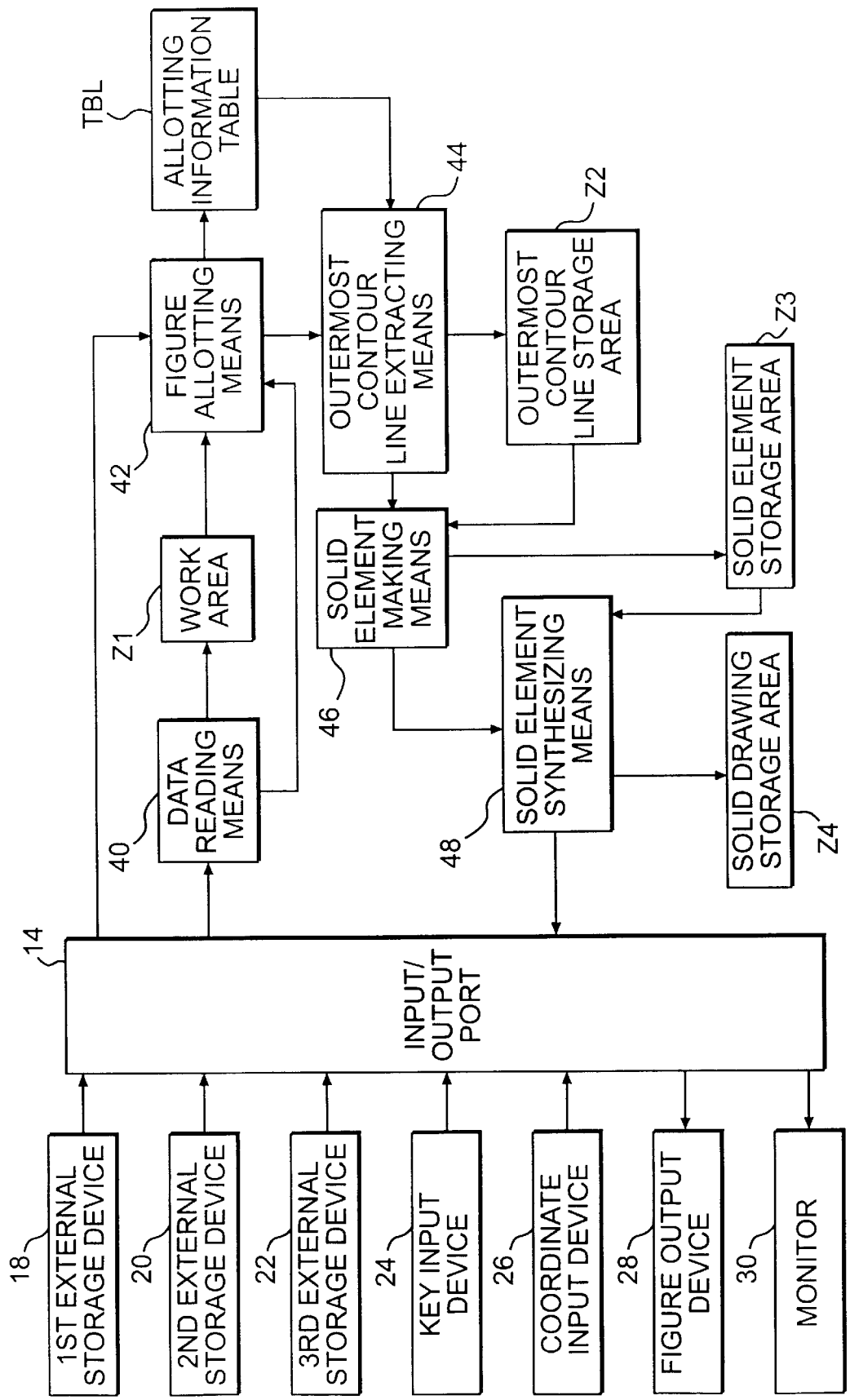
FIG. 2 is a block diagram showing the construction of solid conversion unit incorporated into the three-dimensional CAD system relating to this embodiment.

As shown in FIG. 2, the solid drawing conversion system includes data reading unit 40 for reading and storing in a work area Z1 two-dimensional CAD data made by a two-dimensional CAD system, figure allotting unit 42 for constructing an allotting information table TBL that allots a plurality of figures formed by the read-in two-dimensional CAD data to at least two reference planes occurring in, for example, an orthogonal tri-axial coordinate system, outermost contour line extracting unit 44 for extracting and storing in an outermost contour line storage area Z2 an outermost contour line of each figure occurring at reference planes allotted to the figures, solid element making unit 46 for making and storing in a solid element storage area Z3 a solid element shaped so as to extend along a normal of a reference plane corresponding to the extracted outermost contour line, and solid element synthesizing unit 48 for synthesizing a plurality of constructed solid elements, making three-dimensional CAD data based on the two-dimensional CAD data and storing this three-dimensional CAD data in a solid drawing storage area Z4.

In step S3, first, this solid drawing conversion program reads out two-dimensional CAD data for the product for which a solid drawing is to be made via the data reading unit 40. The reading of this two-dimensional CAD data is carried out by, for example, an operator using the key input device 24 to input a device number displayed by the third external storage device 22, the directory name holding the necessary two-dimensional CAD data and the file name. The data reading unit 40 then reads the required two-dimensional CAD data from the address of the third external storage device 22 based on the inputted device number, directory name and file name and stores this in, for example, a prescribed work area Z1 of the data RAM 12.

Next, in step S4, this is inputted to the figure allotting unit 42 (figure allotting routine).

Figure 4:
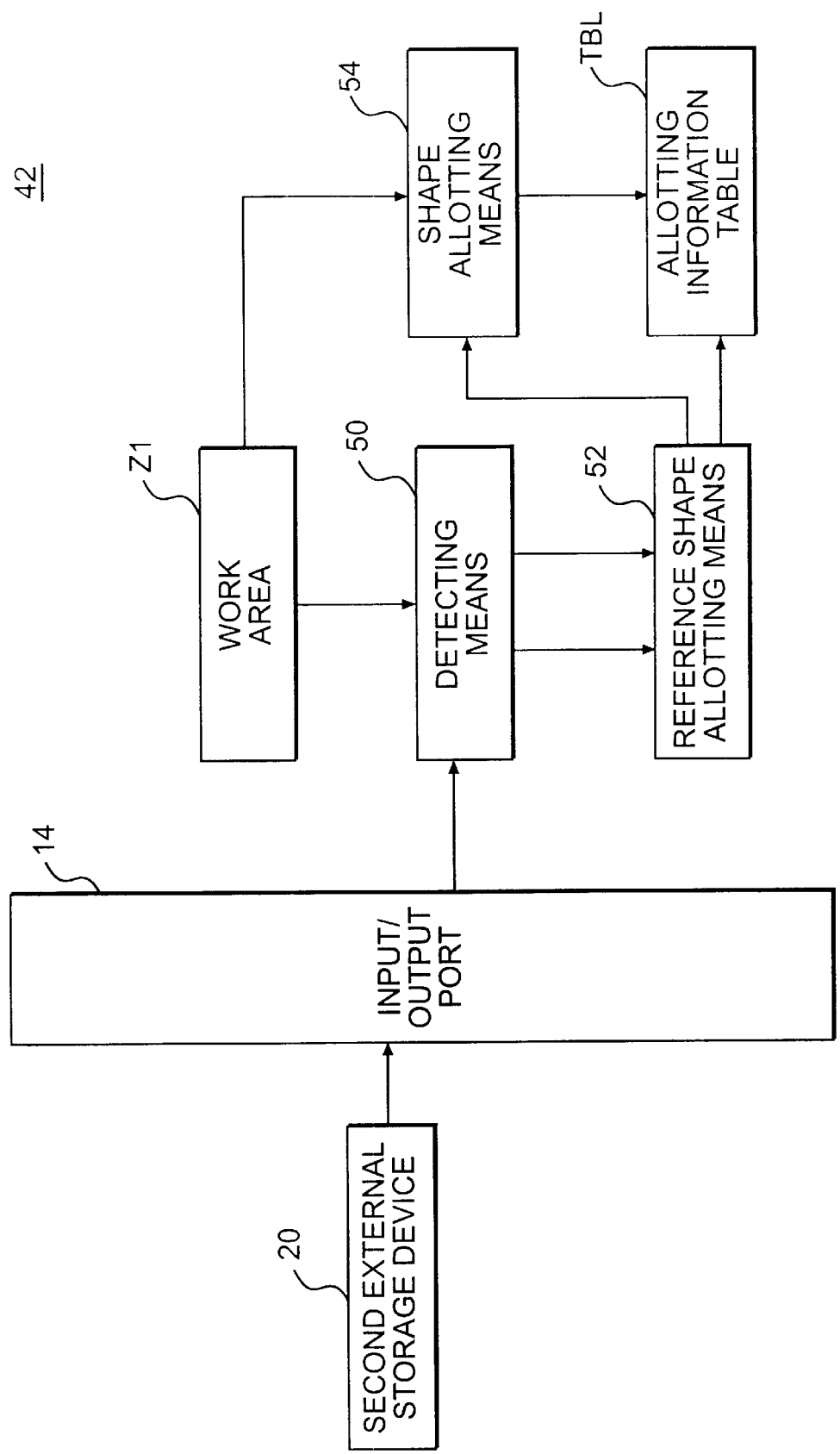
FIG. 4 is a block diagram showing the configuration of the figure allotting unit included in the solid conversion unit.

As shown in FIG. 4, the figure allotting unit 42 includes a detecting unit 50 for detecting two-dimensional CAD data (hereinafter referred to simply as "front shape data") for the front shape of the product, reference shape allotting unit 52 for allotting detected front shape data to an xz plane and recording this in an allotted information table TBL and a shape allotting unit 54 for allotting further two-dimensional CAD data to a respectively corresponding reference plane (for example, the xy or yz plane) taking the plane shape data as a reference and recording this in the allotting information table TBL.

Figure 5:
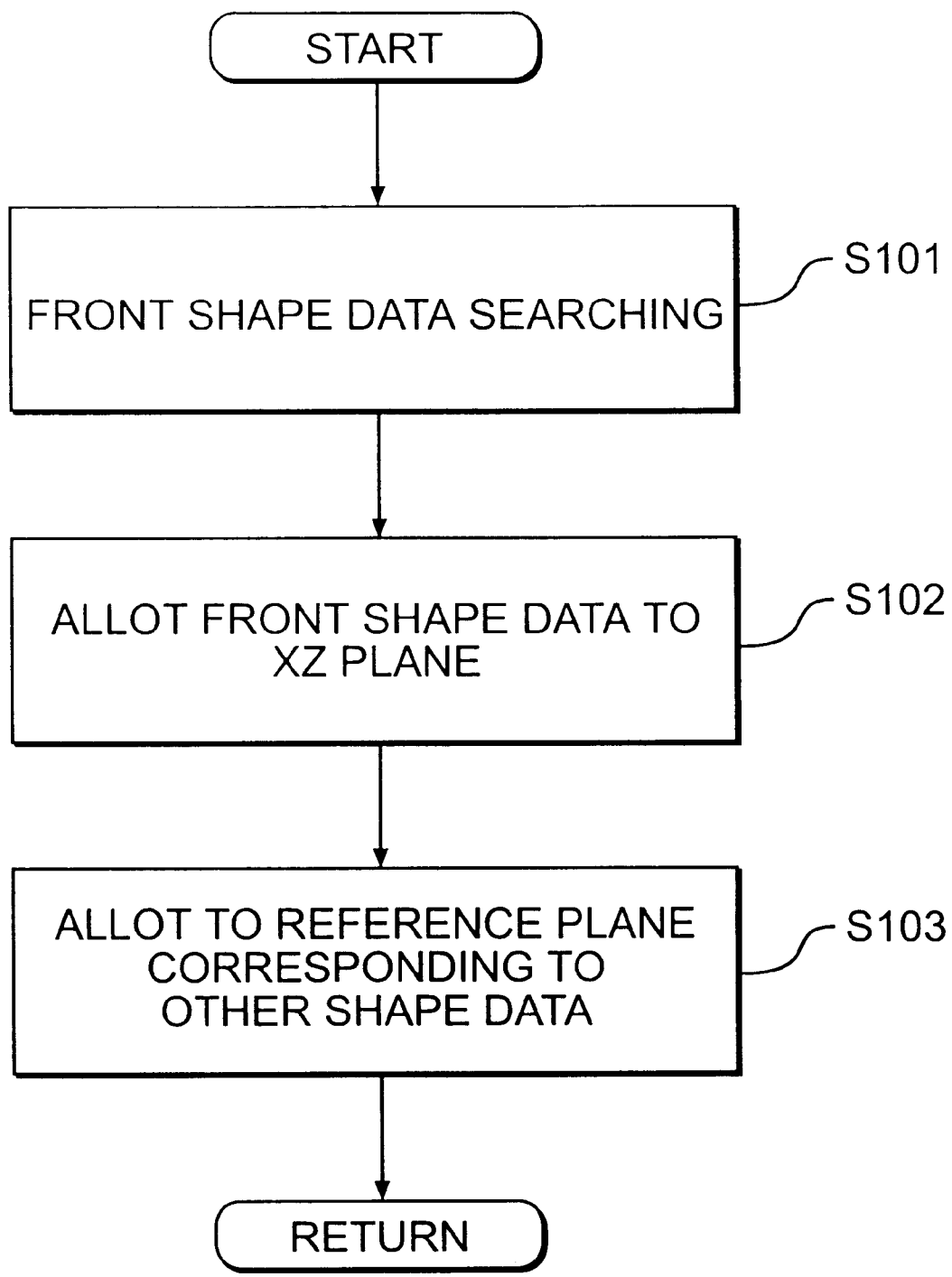
FIG. 5 is a flowchart showing the processing operation for the figure allotting unit.

As shown in FIG. 5, first, in step S101, the figure allotting unit 42 detects front shape data (refer to FIG. 6B) of two-dimensional CAD data stored in the work area Z1 via the detecting unit 50 while referring to technical drawing regulation information within the information data base stored in the second external storage device 20. At the stage where detection is complete, the following step S102 is executed, and as shown, for example, in FIG. 6B, the detected front shape data is allotted to the xz plane via the reference shape allotting unit 52.

Shape data that does not correspond to the front shape data, for example, side shape data or shape data relating to a plane occurring in another coordinate system, for example, shape data relating to a plane normal with an axis positioned so as to be skewed with respect to the orthogonal XYZ axes, is allotted to the xz plane.

Next, in step S103, further two-dimensional CAD data is allotted to corresponding reference planes taking the front shape data as a reference via the shape allotting unit 54. For example, as shown in FIG. 6A, the two-dimensional CAD data (hereinafter referred to simply as "plane shape data") for the plane shape of the product is allotted to the xy plane and, as shown in FIG. 6C, the two-dimensional CAD data (hereinafter referred to simply as side shape data) for the plane shape of the product is allotted to the yz plane.

Information relating to the allotting of plane shape data, front shape data and side shape data is recorded in the allotting information table TBL of the data RAM 12. When the allotted figure data is only figure data relating to the orthogonal XYZ coordinate system, just the logical product is selected and recorded as the logic operation information, with the order of the logical product, i.e. the order of the figure data on which a logical product operation is to be carried out, is recorded.

With the reference shape allotting unit 52, in addition to figure data relating to the xy plane, the yz plane and the xz plane occurring in an orthogonal XYZ coordinate system, allotting is also carried out for figure data relating to planes normalized along axes present at a position skewed with respect to, for example, an orthogonal XYZ axis and figure data relating to section views (refer to FIG. 26C) viewed from an arbitrary direction for certain products. In this case, the respective reference planes correspond to planes taking an axis present at a skewed position as a normal and, for sections, planes taking a direction of projection as a normal.

In particular, the logical product with the figure data relating to the xz plane allotted by the reference shape allotting unit 52 and the logical sum with the solid figure data made for figure data other than that for section drawings are recorded as the logical operation information for the figure data relating to section drawings.

At the stage where processing for the step S103 is complete, the operations performed by the figure allotting unit 42 are complete.

Next, the main routine of FIG. 3 is returned to and the outermost contour line extracting unit (outermost contour line extracting routine) 44 is executed in step S5.

Figure 7:
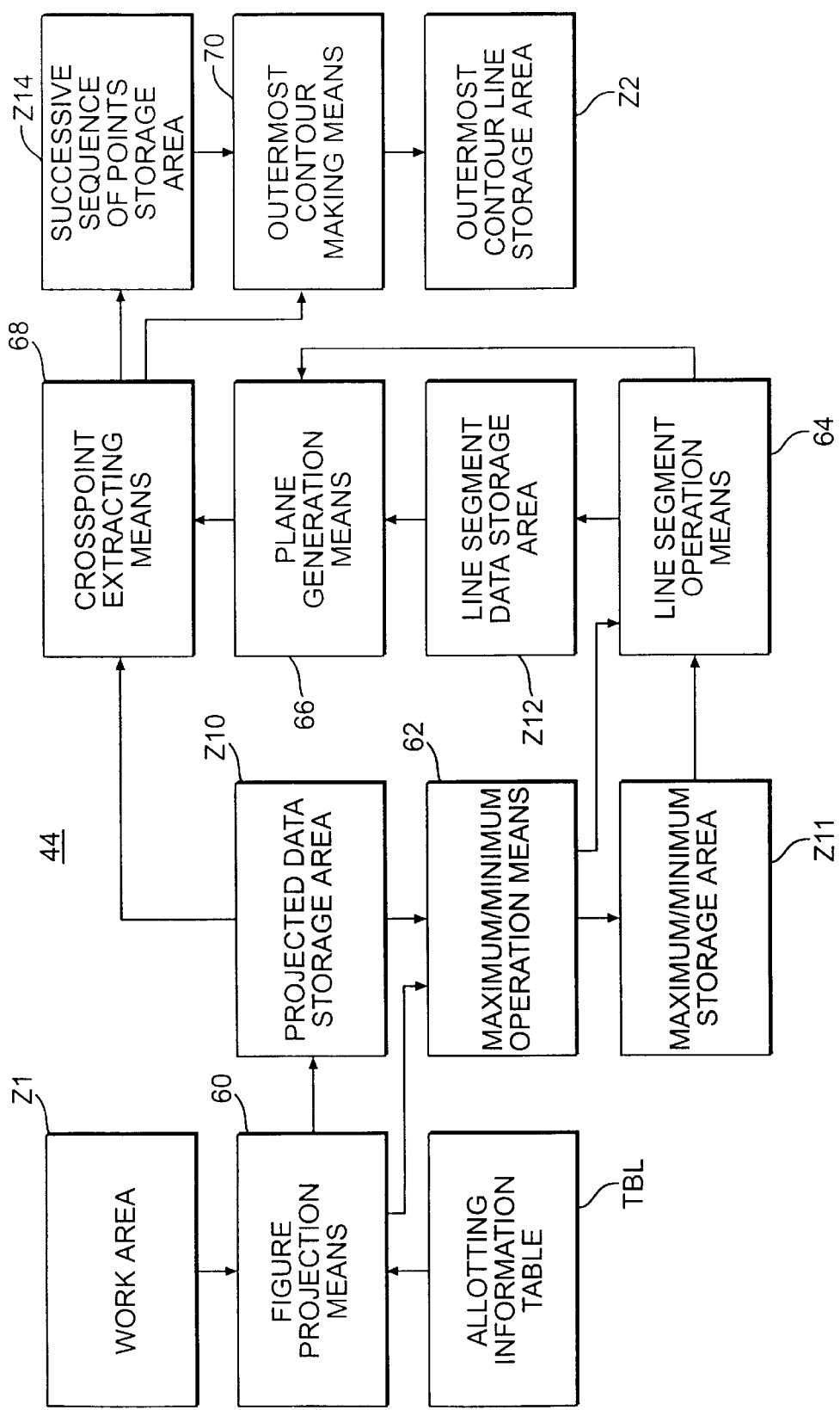
FIG. 7 is a functional block diagram showing the configuration of the outermost contour line extracting unit included in the solid figure conversion unit.

As shown in FIG. 7, the outermost contour line extracting unit 44 includes a figure projection unit 60 for projecting two-dimensional CAD data stored in the work area Z1 to corresponding reference planes in accordance with the recorded contents of the allotting information table TBL and storing this projected figure data in the projected data storage area Z10; maximum/minimum operation unit 62 for calculating and storing in a maximum/minimum storage area Z11 maximum coordinate values and minimum coordinate values on reference planes for which figures projected at each of these reference planes have been projected with reference to the projected figure data; a line segment operation unit 64 for obtaining and storing in a line segment data storage area Z12 linked line segments for the obtained maximum coordinate values and minimum coordinate values; a plane generation unit 66 for generating a plurality of planes perpendicular to the obtained line segments each reference plane, crosspoint extracting unit 68 for, regarding each reference plane, obtaining a crosspoint for a generated one plane and a projected view corresponding to the reference plane, repeating a cycle of extracting two points that are furthest from this cross point for the generated plurality of plane portions, and storing coordinates of successive extracted cross points in a successive sequence of points storage area Z14; and an outermost contour making unit 70 for making one contoured curve of reach reference plane by linking crosspoints extracted by the crosspoint extracting unit 68 and storing this in the outermost contour line storage area Z2 as an outermost contour line occurring at this reference plane.

Figure 8:
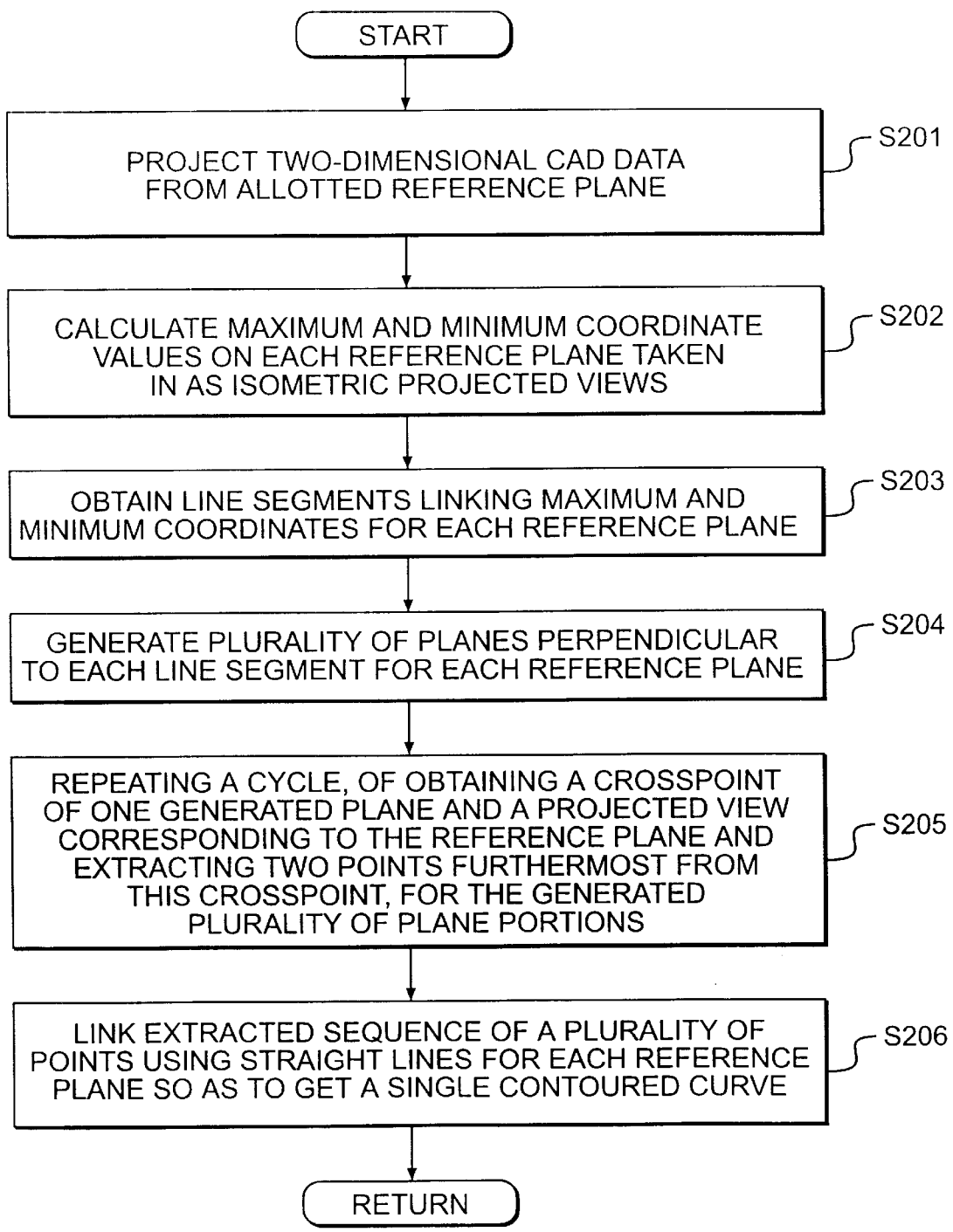
FIG. 8 is a flowchart showing the processing operation for the outer most contour line extracting unit.

As shown in FIG. 8, first, in step S201, the outermost contour line extracting unit 44 projects the two-dimensional CAD data stored in the work area Z1 to the corresponding reference plane in accordance with the recorded contents of the allotting information table TBL via the figure projection unit 60 and stores this in the projected data storage area Z10 as respective projected figure data. In the case of this example, the front shape data shown in FIG. 6B is projected to the xy plane shown in FIG. 9A, the plane shape data shown in FIG. 6A is projected to the xz plane shown in FIG. 10A and the side shape data shown in FIG. 6C is projected to the plane yz shown in FIG. 11A.

Similarly, figure data relating to figure data and section views relating to planes taking axes present at positions that are skewed with respect to the orthogonal axes XYZ as normals are also projected to corresponding reference planes for storing in the projected data storage area Z10 as projected figure data.

Next, in step S202, figures projected to each of the reference planes are taken in via the maximum/minimum operation unit 62 based on the projected figure data, maximum and minimum coordinate values are calculated on the respective reference planes and the maximum and minimum coordinate values that can be taken are stored in the maximum/minimum storage area Z11. In the case of the plane shape data shown in FIG. 9A, max(x, y)=(a, a) and min(x, y)=(−a, −a) are calculated as the maximum coordinate value and minimum coordinate value, respectively. In the case of the front shape data shown in FIG. 10A, max(x, z)=(a, b) and min(x, z)=(−a, 0) are calculated as the maximum coordinate value and minimum coordinate value, respectively. Further, in the case of the side shape data shown in FIG. 11A, max(y, z)=(a, b) and min(y, z)=(−a, 0) are calculated as the maximum coordinate values and minimum coordinate values. Maximum coordinate values and minimum coordinate values are also similarly calculated for projected figure data relating to projected figure data and section views relating to planes normalized along axes present at skewed positions.

Next, in step S203, line segments linking maximum coordinate values and minimum coordinate values obtained by the maximum/minimum operation unit 62 are obtained for each reference plane via the line segment operation unit 64 and the obtained line segment data is stored in the line segment data storage area Z12. In the case of the plane shape data shown in FIG. 9A, a line segment/XY for from the maximum coordinate value max(x, y)=(a, a) to the minimum coordinate value min(x, y)=(−a, −a) is obtained. In the case of the front shape data shown in FIG. 10A a line segment/X, is obtained for from the maximum coordinate value max(x, z)=(a, b) to the minimum coordinate value min(x, z)=(−a, 0). Further, in the case of the side shape data shown in FIG. 11A, a line segment/YZ is obtained for from this maximum coordinate value max(y, z)=(a, b) to the minimum coordinate value min(y, z)=(−a, 0).

Figure 9B:
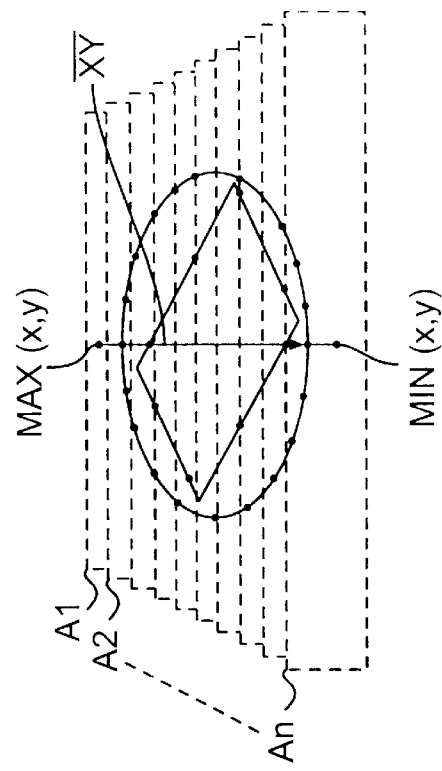
FIGS. 9A–D are views illustrating the process up to extracting of the outermost contour line from the plane shape data, with FIG. 9A showing an example of projection of the plane shape data at the xy plane, obtaining of maximum and minimum coordinate values on the xy plane which projected views can take, and obtaining of the linking line segment/XY for the maximum coordinate and the minimum coordinate, FIG. 9B showing an example of generating a plurality of planes at right-angles to the line segment/XY, FIG. 9C showing an example of obtaining the crosspoints of the plurality of generated planes and the plane shape data and generating of a group of a string of consecutive points, and FIG. 9D showing an example of linking the generated string of consecutive points using straight lines so as to make a single contoured curve (outermost contour line)
Figure 10A:
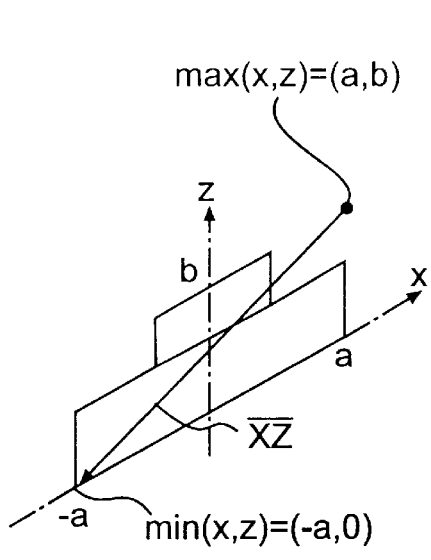
FIGS. 10A–D are views illustrating the process up to extracting of the outermost contour line from the plane shape data, with FIG. 10A showing an example of projection of the plane shape data at the xz plane, obtaining of maximum and minimum coordinate values on the xz plane which projected views can take, and obtaining of the linking line segment/X, for the maximum coordinate and the minimum coordinate, FIG. 10B showing an example of generating a plurality of planes at right-angles to the line segment/X, FIG. 10C of the same showing an example of obtaining the crosspoints of the plurality of generated planes and the plane shape data and generating of a group of a string of consecutive points, and FIG. 10D showing an example of linking the generated string of consecutive points using straight lines so as to make a single contoured curve (outermost contour line)
Figure 10B:
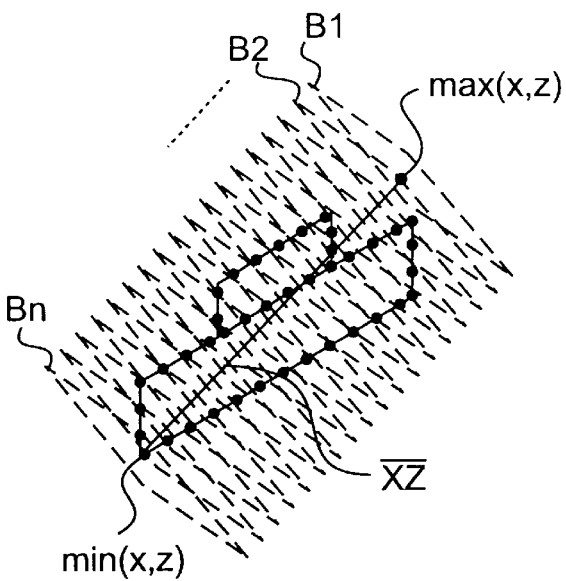

Next, in step S204, a plurality of planes at right angles to the obtained line segments are generated for each reference plane via the plane generation unit 66. As shown in FIG. 9B, a plurality of planes (A1, A2, . . . An) that are perpendicular to the line segments/XY are generated for the plane shape data shown in FIG. 9A, a plurality of planes (B1, B2, . . . Bn) perpendicular to the line segments/X, are generated as shown in FIG. 10B for the front plane shape data shown in FIG. 10A, and a plurality of planes (C1, C2, . . . On) perpendicular to the line segment/YZ as shown in FIG. 11B are generated for the side shape data shown in FIG. 11A.

Next, in step S205, the crosspoint of one of the generated planes and a projected view corresponding to the reference plane is obtained for each of the reference planes via the crosspoint extracting unit 68. A cycle where the two furthermost points from this crosspoint are extracted is then repeated for the plurality of generated plane portions, with the coordinates of the extracted successive sequence of points being stored in the successive sequence of points storage area Z14.

Figure 9C:
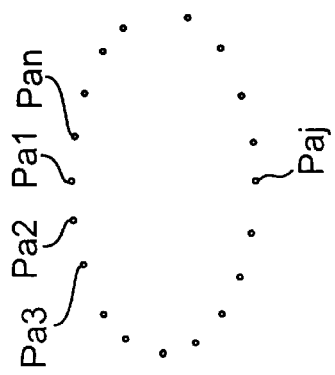
Figure 10C:
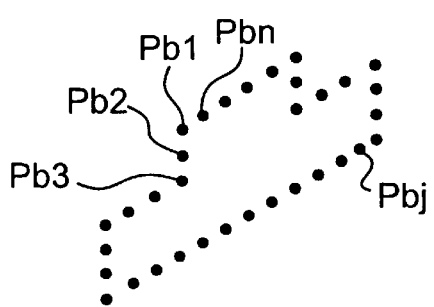

Specifically, crosspoints for the plurality of planes (A1, A2, . . . An) generated for the plane shape data shown in FIG. 9B and the plane shape data are obtained. The furthermost two points are then extracted for each plane (A1, A2, . . . An) so that, as shown in FIG. 9C, one group of a consecutive sequence of points (Pa1, Paz, Pa3 . . . Paj . . . Pan) is generated. After this, crosspoints for the plurality of planes (B1, B2 . . . Bn) generated for the front shape data shown in FIG. JOB and the plane shape data are obtained. The furthermost two points for each of the planes (B1, B2 . . . Bn) are then extracted and, as shown in FIG. 10C, a group of a successive sequence of points −(Pb1, Pb2, Pb3 . . . Pbj . . . Pbn) are generated.

Crosspoints for the plurality of planes (C1, C2 . . . Cn) generated for the side shape data shown in FIG. 11B and the plane shape data are obtained. The two furthermost points for each of the planes (C1, C2 . . . Cn) are then extracted and a group of a successive sequence of points (Pc1, Pc2, Pc3 . . . Pcj . . . Pcn) are generated as shown in FIG. 11C.

Next, in step S206, the crosspoints extracted by the crosspoint extracting unit 68 for each of the reference planes via the outermost contour making unit 70 are linked using straight lines so as to make one contour line that is taken as an outermost contour line occurring at this reference plane.

Figure 9D:
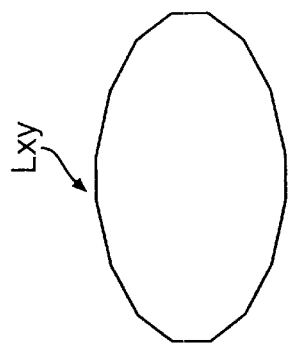
Figure 9A:
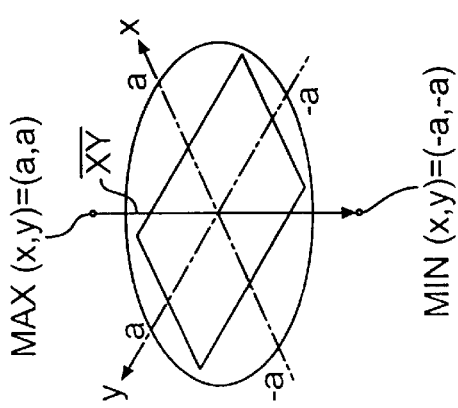
Figure 10D:
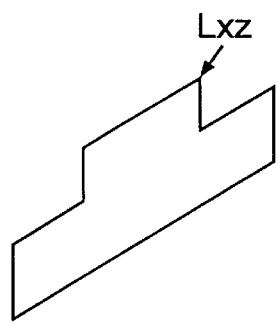

Specifically, first, as shown in FIG. 9D, the outermost contour line Lxy relating to the plane shape data is made by linking the group of the successive sequence of points (Pa1, Paz, Pa3 . . . Paj . . . Pan) shown in FIG. 9C in a series using a straight line. Further, an outermost contour line Lxz relating to the front shape data, as shown in FIG. 10D, is made by linking the group of a successive sequence of points (Pb1, Pb2, Pb3 . . . Pbj . . . Pbn) shown in FIG. 10C in a series using a straight line. Moreover, the outermost contour line Lyz relating to the side shape-data as shown in FIG. 11D is made by linking the group of the successive sequence of points (Pc1, Pc2, Pc3 . . . Pcj . . . Pcn) shown in FIG. 11C using a straight line in a series. At this time, an outermost contour line is also made for figure data relating to outermost contour lines and sections for figure data relating to planes taking an axis present at a skewed position as a normal.

Data generated for each of the outermost contour lines Lxy, Lxz and Lyz is stored in a prescribed storage area of the data RAM 12, for example, the outermost contour line storage area Z2. Then, when the processes in step S206 is finished, this outermost contour line extracting unit 44 (outermost line extracting sub-routine) ends.

Next, returning to the main routine of FIG. 3, the solid element making unit 46 (solid element making sub-routine) is entered in the following step S6.

Figure 12:
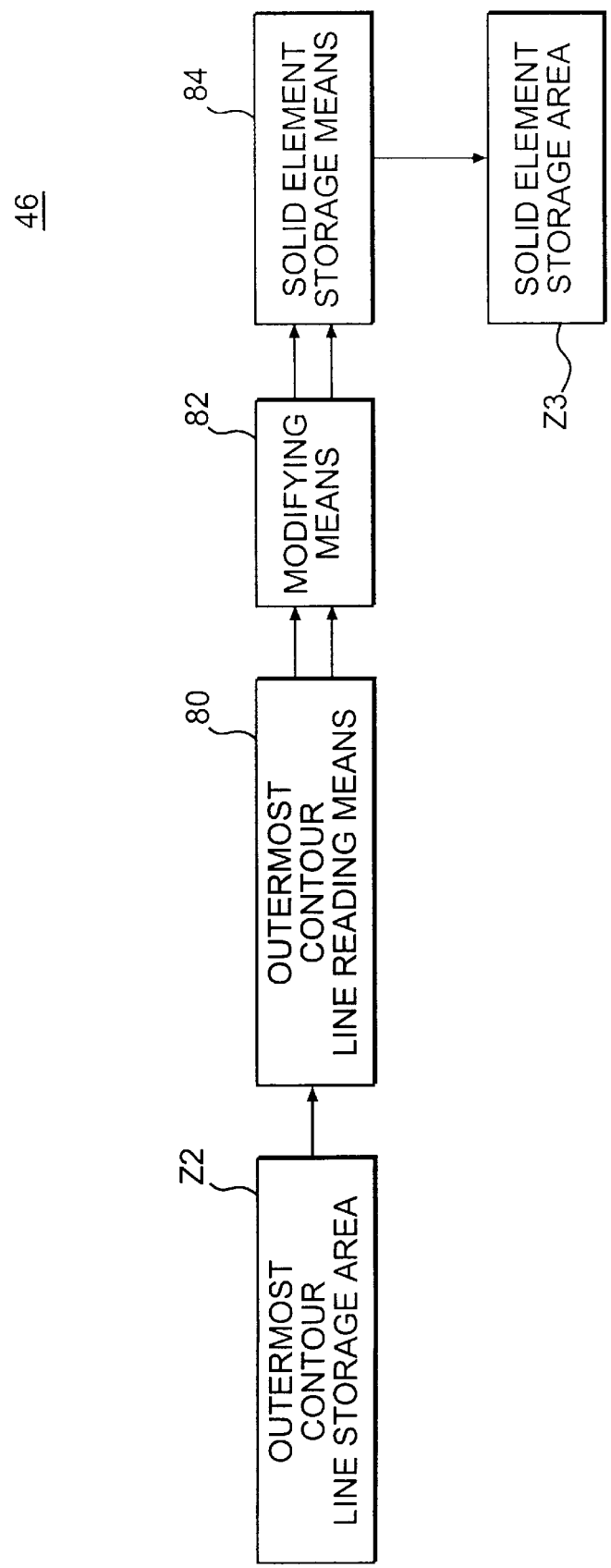
FIG. 12 is a functional block diagram showing the configuration of the solid element making unit included in the solid conversion unit.

As shown in FIG. 12, solid element making unit 46 includes outermost contour line reading unit 80 for reading outermost contour line data from the outermost contour line storage area Z2 of the data RAM 12, modifying unit 82 for extending a read-in outermost contour line a prescribed length in the direction of the normal for the reference plane corresponding to this outermost contour line and solid element storage unit 84 for storing data relating to, for example, three solid figures made by extending via the modifying unit 82 in the solid element storage area Z3 of the RAM 12 as solid element data.

Figure 13:
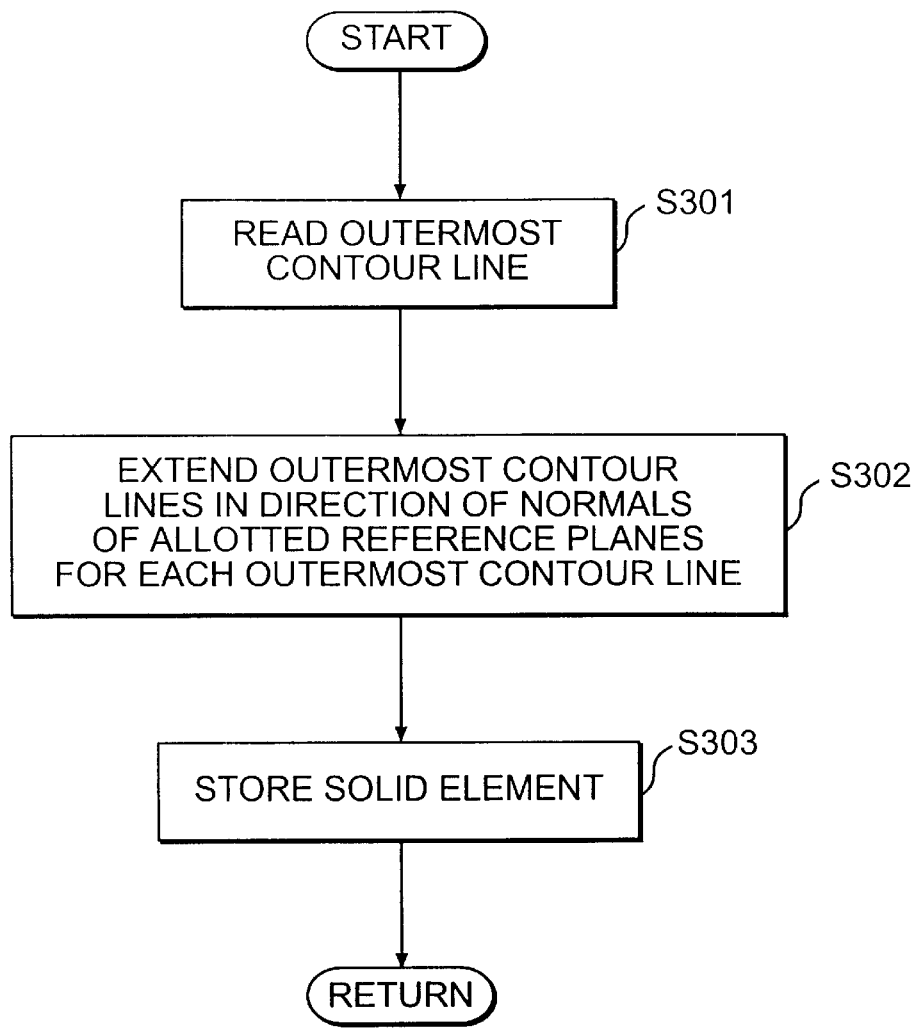
FIG. 13 is a flowchart showing the processing operation for the solid element making unit.

As shown in FIG. 13, the solid element making unit 46 (solid element making sub-routine) first reads the outermost contour outline from the outermost contour line storage area Z2 of the data RAM 12 via the outermost contour line reading unit 80 in step S301.

Next, in step S302, the read-in outermost contour line is extended by a prescribed length in the direction of the normal of the corresponding reference plane via the modifying unit 82 and one solid element is thereby constructed.

Figure 14A:
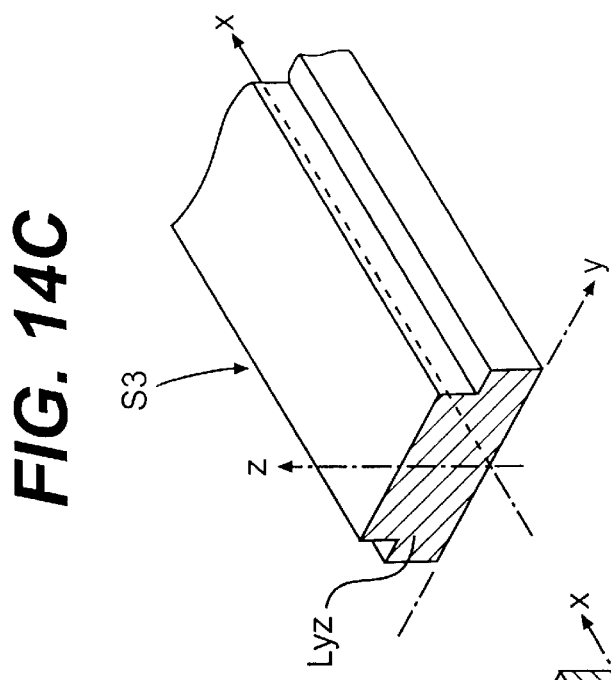
FIGS. 14A–C are inclined views showing an example of solid elements make by the solid element making means, with FIG. 14A showing an example of making solid elements based on outermost contour lines relating to the plane shape data of FIG. 9D, FIG. 14B showing an example of making solid elements based on outermost contour lines relating to the front shape data of FIG. 10D, and FIG. 14C showing an example of making solid elements based on outermost contour lines relating to the side shape data of FIG. 11D.

Specifically, the reference plane for the outermost contour line Lxy relating to the plane shape shown in FIG. 9D is the xy plane and the outermost contour line Lxy is therefore extended in the direction of the z axis. As shown in FIG. 14A, the plane shape formed by the outermost contour line Lxy is then taken as a lateral plane and a cylindrical-shaped solid element (hereinafter simply referred to as a first solid element S1) taking the z axis to be its axial direction is constructed.

Figure 14B:
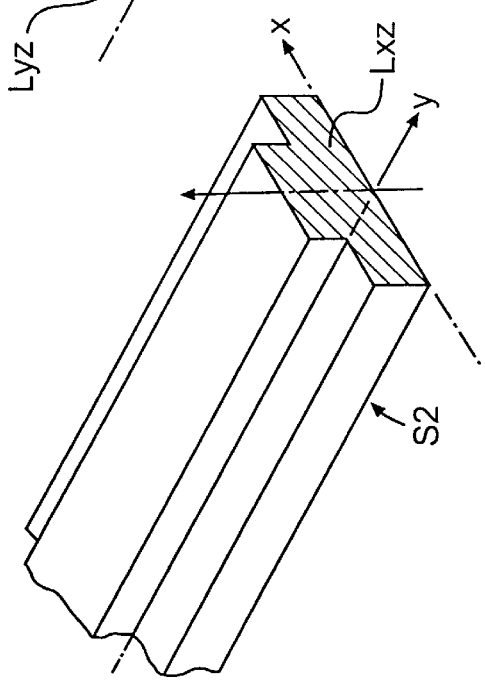

The reference plane for the outermost contour line Lxz relating to the plane shape shown in FIG. 10D is the xy plane and the outermost contour line Lxz is therefore extended in the direction of the y axis. As shown in FIG. 14B, the plane shape formed by the outermost contour line Lxz is then taken as a lateral plane and a cylindrical-shaped solid element (hereinafter simply referred to as a second solid element S2) taking the y axis to be its axial direction is constructed.

Figure 14C:
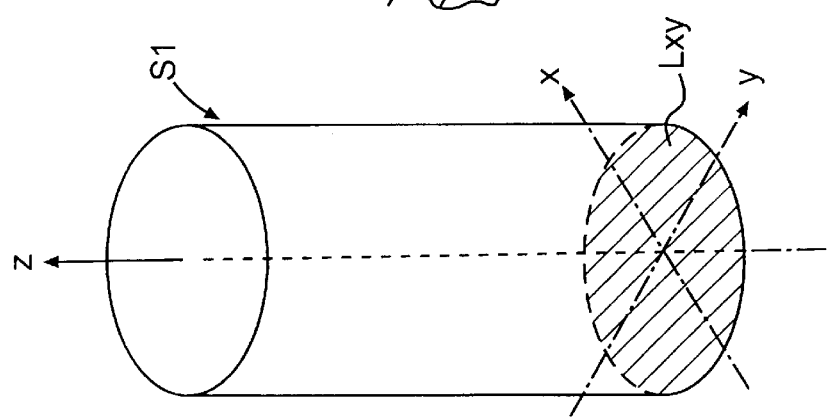

The reference plane for the outermost contour line Lyz relating to the plane shape shown in FIG. 11D is the yz plane and the outermost contour line Lyz is therefore extended in the direction of the x axis. As shown in FIG. 14C, the plane shape formed by the outermost contour line Lyz is then taken as a lateral plane and a cylindrical-shaped solid element (hereinafter simply referred to as a third solid element S3) taking the x axis to be its axial direction is constructed.

With regards to outermost contour lines for figure data relating to planes taking an axis present at a position skewed with respect to the orthogonal XYZ axes as a normal, the outermost contour line is extended along the normal, the plane shape formed by the outermost contour line is take to be a lateral plane and a cylindrical solid element taking the axial direction as a normal direction is made. With regards to the outermost contour line for figure data relating to the section view, the outermost contour line is extended in the projection direction, the plane shape formed by the outermost contour line is take to be a lateral plane and a cylindrical solid taking the axial direction as a direction of projection is made.

Next, in step S303, all of the solid elements including the constructed first to third solid elements S1 to S3 are stored in a prescribed storage area of the data RAM 12 such as, for example, the solid element storage area Z3.

At the stage where the process in step S303 ends, the process performed by the solid element making unit 46 (solid element making sub-routine) ends.

Next, the main routine of FIG. 3 is returned to and the process performed by the solid element synthesizing unit 48 (solid element synthesizing sub-routine) is entered in step S7.

Figure 15:
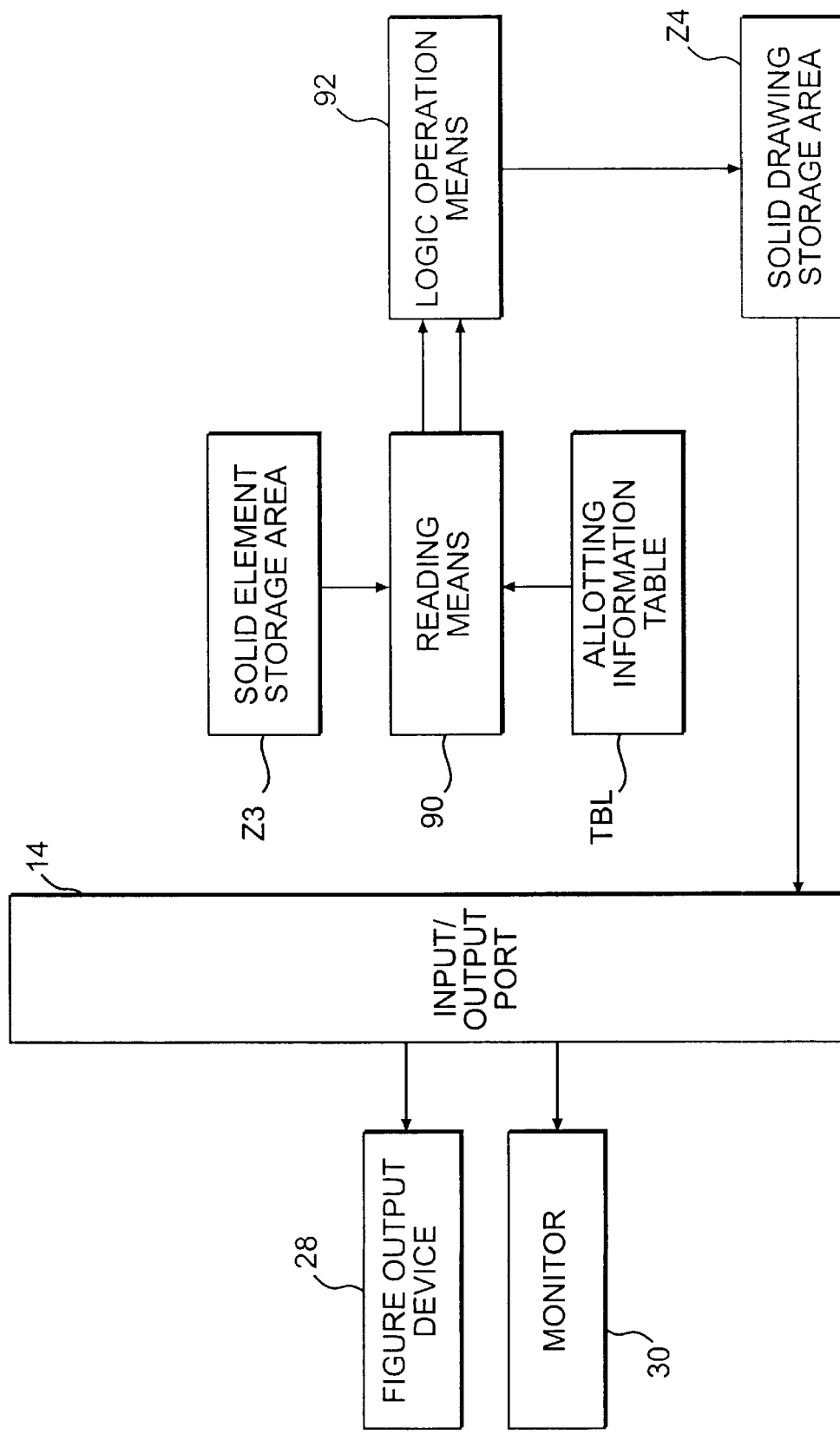
FIG. 15 is a functional block diagram showing the configuration of the solid element synthesizing unit included in the solid conversion unit.

As shown in FIG. 15, the solid element synthesizing unit 48 includes a data reading unit 90 for reading corresponding solid element data from the solid element storage area Z3 in accordance with the order of allocation of the figure data recorded in the allotting information table TBL and a logic operation unit 92 for performing operations on solid element data read-out in order via the reading unit 90 based on logic operation information recorded in the allotting information table TBL and synthesizes each item of solid pixel data.

Figure 16:
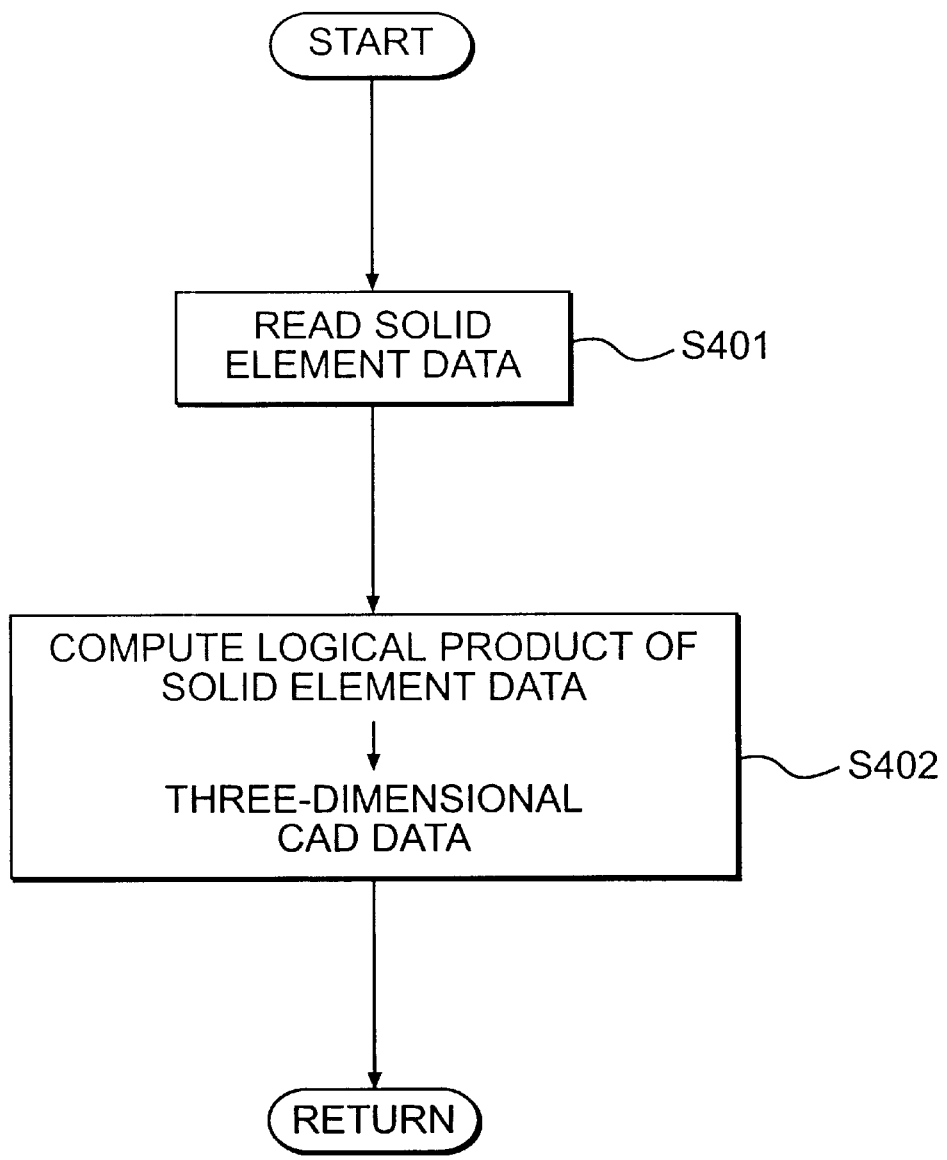
FIG. 16 is a flowchart showing the processing operation for the solid element synthesizing unit.
Figure 17:
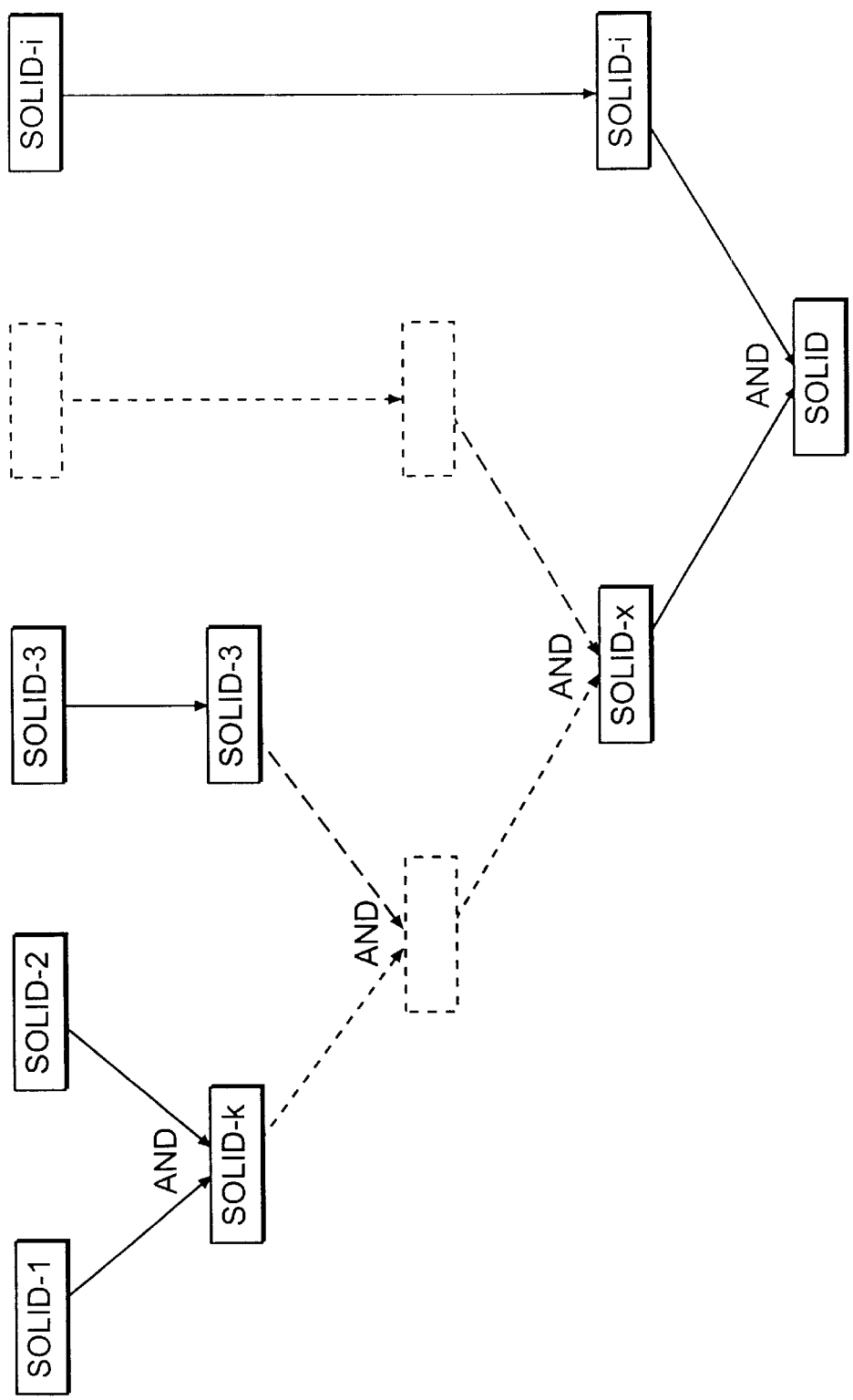
FIG. 17 is a view illustrating the order of synthesizing solid elements using the solid element synthesizing unit.

As shown in FIG. 16, this solid element synthesizing unit 48 (solid element synthesizing routine) first, in step S401, sequentially reads out corresponding solid element data from the solid element storage area Z3 in accordance with the allocation order of the figure data recorded in the allotting information table TBL via the reading unit 90.

Next, in step S402, all of the solid pixel data is synthesized via the logic operation unit 92 on solid element data read-out via the reading unit 90 based on logic operation information recorded in the allotting information table TBL.

For example, when figure data recorded in the allotting information table TBL relates to an orthogonal XYZ coordinate system, the procedure for the logic operation unit is to first take the logical product of the first solid element (SOLID-1) and the second solid element (SOLID-2) and take this as the kth solid element (SOLID-k). Then, the logical product of the kth solid element (SOLID-k) and the third solid element (SOLID-3) is found. In a similar manner, the logical sum of sequential solid elements is taken and taken to be the xth solid element (SOLID-x). Finally, the logical product of the xth solid element (SOLID-x) and the ith solid element (SOLID-i) is taken, and the final solid element (SOLID), i.e. three-dimensional CAD data based on the two-dimensional CAD data is constructed.

Figure 18A:
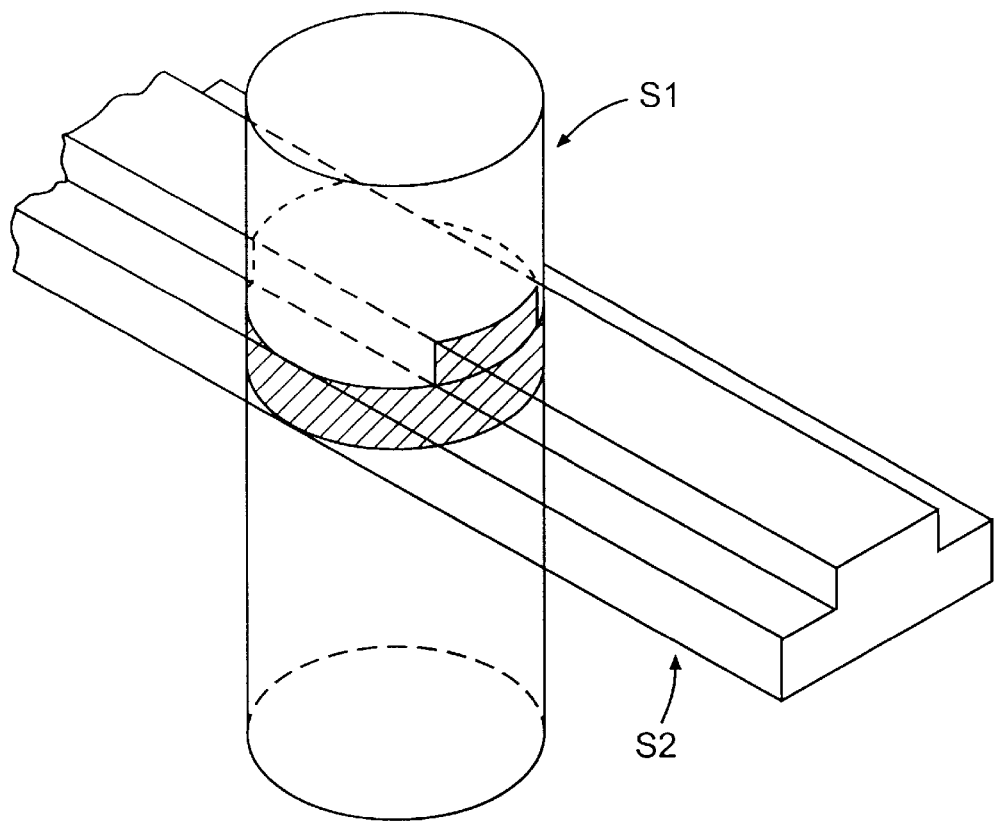
FIGS. 18A–B are views illustrating the synthesis of a first solid element based on plane shape data and a second solid element based on front shape data, with FIG. 18A showing the state of synthesis of the first solid element and the second solid element, and FIG. 18B showing the outer shape of the synthesized elements made by synthesis.
Figure 18B:
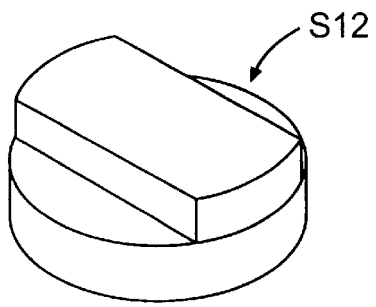

Specifically, when a description is given based on the first to third solid elements S1 to S3 shown in FIG. 14, data relating to the first and second solid elements S1 and S2 shown in FIG. 14A and FIG. 14B is first read-out via the reading unit 90. Next, as shown in FIG. 18A, the logical product of the first solid element S1 and the second solid element S2 is computed via the logic operation unit 92 and the synthesized element S12 is made as shown in FIG. 18B.

Figure 19A:
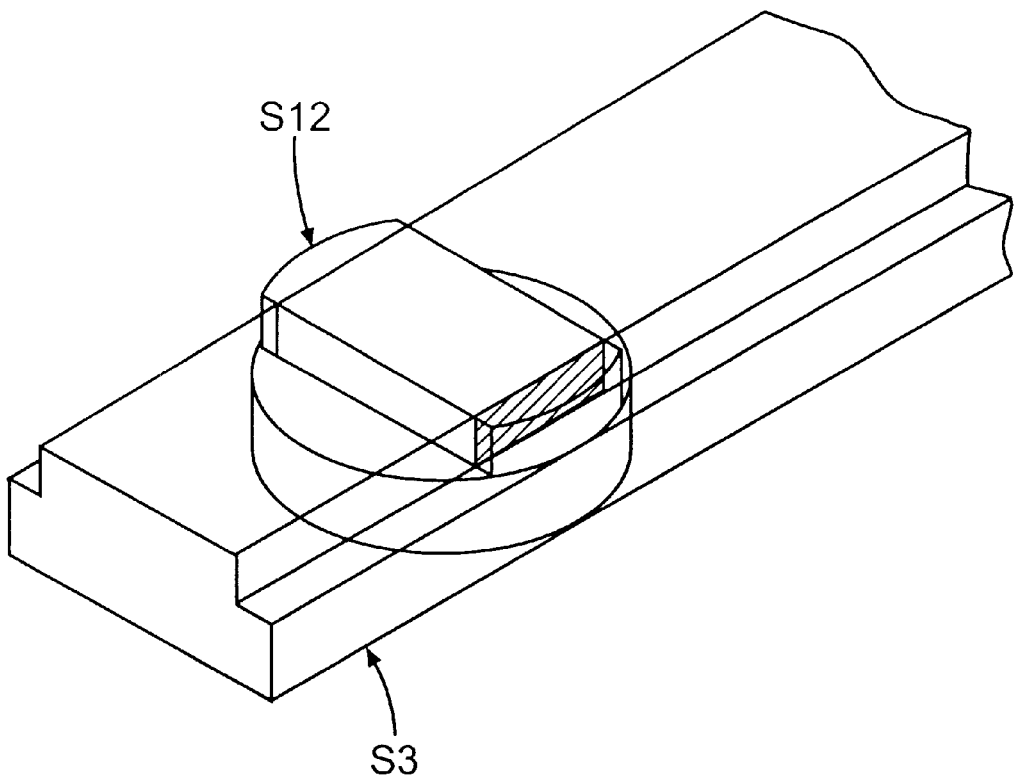
FIGS. 19A–B are views illustrating the synthesis of the synthesized element and the third solid element based on the side shape data, with FIG. 19A showing the conditions of synthesis for the synthesized element and the third solid element and FIG. 19B showing the solid view made by synthesis (logical product operation)
Figure 19B:
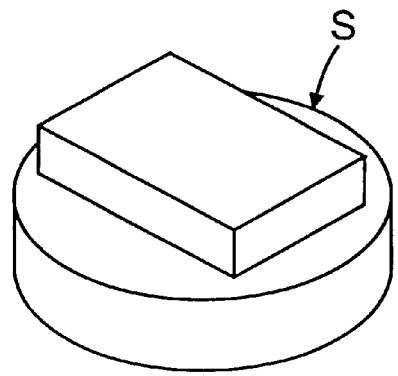

Next, the third solid element S3 is read-out via the reading unit 90 and as shown in FIG. 19A, the logical product of the synthesized element S12 and the third solid element S3 is computed so that the solid view S shown in FIG. 19B, i.e. three-dimensional CAD data based on the plane shape data, front shape data and side shape data shown in FIG. 6A to FIG. 6C, is complete.

As this process is also the same for figure data relating to planes taking an axis that is in a position that is slued with respect to, for example, an orthogonal XYZ axis, a description is omitted.

On the other hand, when figure data relating to a section view is included in two-dimensional CAD data, the logical product of the solid element for the figure data relating to the xz plane allotted by the reference shape allotting unit 52 shown in FIG. 4 and the solid element relating to the section drawing is calculated and one item of section solid figure data is made. Further, the logical product of the solid figure data made by logical product computations across all of the solid elements relating to figure data other than section views and the section solid figure data is computed and three-dimensional CAD data relating to the two-dimensional CAD data that includes the section view is made.

The constructed three-dimensional CAD data is stored in a prescribed storage area of the data RAM 12, for example, the solid drawing storage area Z4. The three-dimensional CAD data is then converted to data for image display use via a program separate from the and outputted to the figure output device 28 or the monitor 30 and printed or displayed as a solid view based on the two-dimensional CAD data on blank paper or on the screen of the monitor 30.

Lines for fine members that have been deleted by the outermost contour line extraction process in the outermost contour line extracting unit 44 such as, for example, cylindrical lines for holes or lines for projections etc. can now be added to the three-dimensional CAD data made by the solid view conversion program. In this case, the additions take into consideration the orientation of the external shape of the product taken as the solid but as cylindrical lines for holes and lines for projections etc. are extremely simple figures, this adding work can be finished in a short period of time.

Therefore, in the three-dimensional CAD data system relating to this embodiment, a plurality of solid elements including outermost contour lines for each reference plane of the two-dimensional CAD data extended in cylindrical shapes are constructed and three-dimensional CAD data is generated by synthesizing this plurality of solid elements. Solid views of shapes that take up the most time can therefore be automatically made without any or with a minimum of data being input by an operator so as to reduce the work put in by the operator and the operation time by a factor of nine.

Further, arithmetic processing can be carried out for two-dimensional CAD data including just figure data relating to an orthogonal XYZ coordinate system in the same simple manner even in the case where, in addition to two-dimensional CAD data relating to an orthogonal XYZ coordinate system, figure data relating to planes in other coordinate systems such as, for example, figure data relating to planes taking an axis positioned at an axis that is slued with respect to the orthogonal XYZ axes as a normal or figure data relating to a partially projected view (section view) for when the product is viewed from an arbitrary direction is included. This is extremely advantageous with regards to reducing the number of program steps and in system maintenance.

The invention therefore eliminates difficulties with respect to CAD operations (this also includes the awareness of difficulty as well as the difficulty of the operations themselves) and provides an increase in the utilization factor of CAD systems as well as dramatic progress as regards to the development of three-dimensional design systems for automobiles, motorcycles and for construction, shipbuilding and electronic equipment, etc.

In particular, at the outermost contour line extracting unit 44 in the three-dimensional CAD system relating to the present invention, the outermost contour lines of, each reference plane for the product are made to be one contoured curve configured of a plurality of straight lines linked together. Thereafter, the processes for making the solid elements at the solid element making unit 46 and the synthesizing process at the solid element synthesizing unit 48 are simple. As a result, it is possible to make solid views for products rapidly, the number of program steps can be made smaller and reductions in the program capacity can be achieved.

Figure 20C:
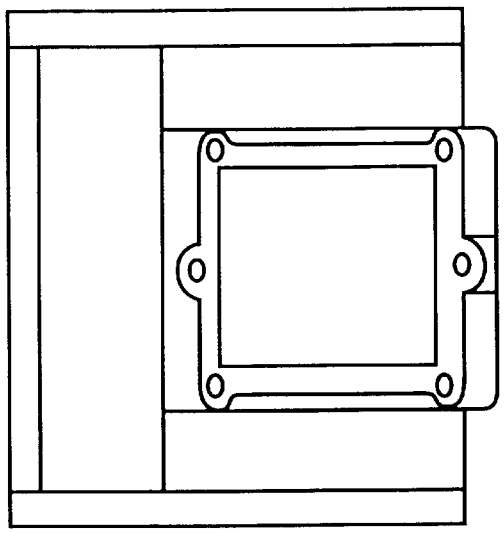
FIGS. 20A–C are three planar views showing a cylinder block, with FIG. 20A showing a plane view, FIG. 20B showing a front view and FIG. 20C showing a side view.
Figure 20A:
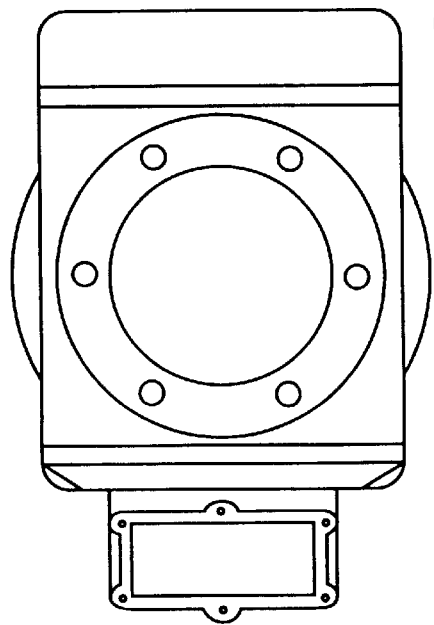
Figure 20B:
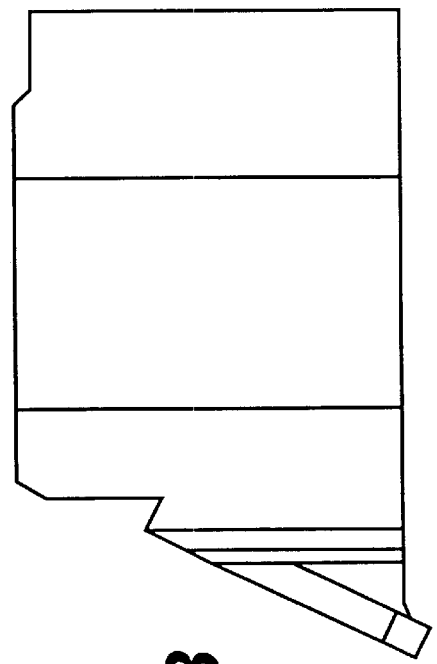
Figure 21C:
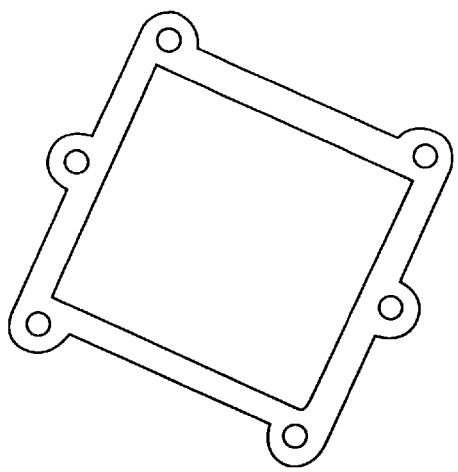
FIGS. 21A–C are three planar views showing a cylinder block, with FIG. 21A showing a plane view, FIG. 21B showing a front view and FIG. 21C showing a section view.
Figure 21A:
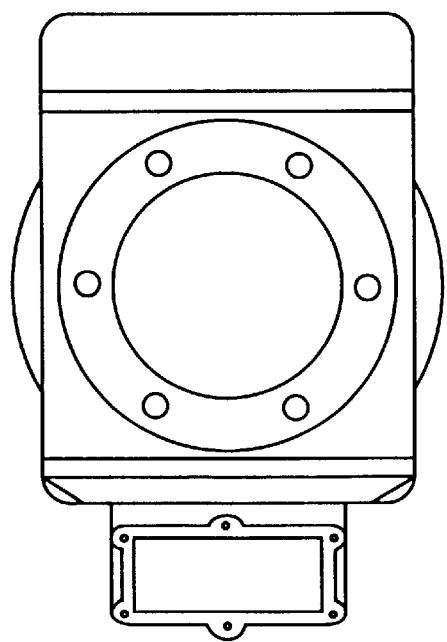
Figure 21B:
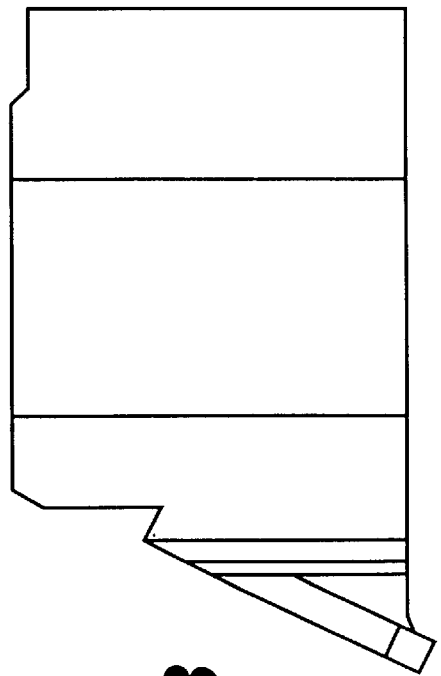
Figure 22:
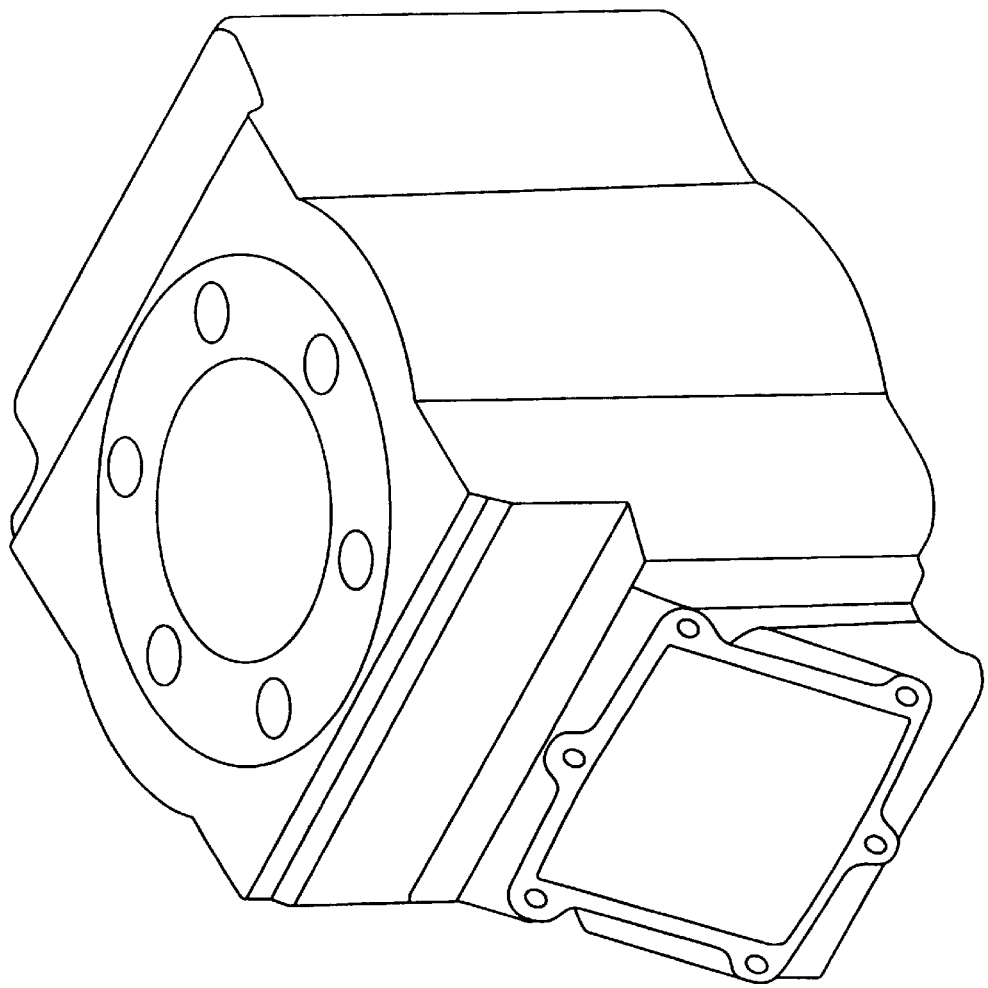
FIG. 22 is an inclined view showing the conditions of making a solid drawing for a cylinder block from the three plane views of the cylinder block shown in FIGS. 20A–C and FIGS. 21A–C using the three-dimensional CAD system of the invention.

FIG. 22 illustrates an example of making a solid view from three plane views of the cylinder block shown in FIG. 20 using the three-dimensional CAD system relating to the present invention which is shown together with an example of making a solid view from three planes (including section views) of the cylindrical block shown in FIG. 21.

This invention is by no means limited to the above embodiments, and various configurations can be adopted without deviating from the scope of this invention.

Effects

As described above, according to the three-dimensional CAD system of the present invention, data reading unit for reading two-dimensional CAD data made by a two-dimensional CAD system, figure allotting unit for allotting a plurality of figures formed of read-in two-dimensional CAD data to at least two reference planes, outermost contour line extracting unit for extracting outermost contour lines for each figure occurring at the reference planes allotted to the figures, solid element making unit for making solid elements for shapes extended in directions of normals for reference planes corresponding to the extracted outermost contour lines and solid element synthesizing unit for synthesizing made plurality of solid elements so as to make three-dimensional CAD data based on the two-dimensional CAD data are provided.

As a result, the time for making a three-dimensional CAD drawing from a two-dimensional CAD drawing is dramatically reduced, and the operation processing of the program is simplified regardless of the inputting work of the CAD operators and the type of the two-dimensional figure data.

Further, according to the method of converting two-dimensional CAD drawings to three-dimensional CAD drawings relating to the present invention, a plurality of figures formed of two-dimensional data made using a two-dimensional CAD system are allotted to at least two reference planes, solid elements of shapes are made that are extended in the direction normal to a reference plane corresponding to an outermost contour line of each figure occurring at the reference planes that the figures are allotted to and made plurality of solid elements are synthesized and three-dimensional CAD data based on the two-dimensional CAD data is constructed.

As a result, a plurality of solid elements are made by cylindrically extending outermost contour lines occurring at each of the reference planes for the two-dimensional CAD data, with this plurality of solid elements then being synthesized to make three-dimensional CAD data. Solid drawings for shapes that take up the longest amount of time can therefore be made automatically without an operator inputting any data or with an operator inputting a minimum of data so that the amount of work to be done by an operator and the operation time can both be reduced by a factor of nine.

Simple operation processing can also be carried out in the case where, in addition to two-dimensional CAD data relating to orthogonal XYZ coordinate systems, figure data relating to planes taking, for example, an axis in a position skewed with respect to the orthogonal XYZ axes as a normal or figure data relating to partial projection views (section views) where a product is viewed from an arbitrary direction. This means that the number of program steps can be reduced and is extremely useful with regards to system maintenance.

Further, according to the method of converting two-dimensional CAD drawings to three-dimensional CAD drawings of the present invention there is provided a data reading step of reading two-dimensional CAD data made by a two-dimensional CAD system, a figure allocation step of allotting a plurality of figures formed of read-in two-dimensional CAD data to at least two reference planes, an outermost contour line extracting step of extracting outermost contour lines for each figure occurring at the reference planes allotted to the figures, a solid element making step of making solid elements for shapes extended in directions of normals for reference planes corresponding to the extracted outermost contour lines and a solid element synthesizing step of synthesizing made plurality of solid elements and making three-dimensional CAD data based on the two-dimensional CAD data.

As a result, the time for making a three-dimensional CAD drawing from a two-dimensional CAD drawing is dramatically reduced, and the operation processing of the program is simplified regardless of the inputting work of the CAD operators and the type of the two-dimensional figure data.

ARTICLE OF MANUFACTURE

The invention disclosed herein may take the form of an article of manufacture. More specifically, the article of manufacture is a computer-usable medium, including a computer-readable program code embodied therein wherein the computer-readable code causes CPU 16 to execute the inventive method.

A computer diskette may be included with the first external storage device 18 in FIG. 1 and is an example of such a computer-usable medium. When program stored on the disc is loaded by the first external storage device 18 into, for example, operation RAM 10, the computer-readable program code may then be executed by the CPU 16. In this way, the CPU 16 may be instructed to perform the inventive methods disclosed herein.

The invention being thus described, it will be obvious that the same may be varied in many ways. Such variations are not to be regarded as a departure from the spirit and scope of the invention, and all such modifications as would as would be obvious to one skilled in the art are intended to be included within the scope of the following claims.

I claim:

1. A three-dimensional CAD system, comprising:

data reading means for reading two-dimensional CAD data;

figure allotting means for allotting a plurality of figures to at least two reference planes from read-in two-dimensional CAD data, wherein the at least two reference planes include a parallel plane parallel to an X, Y, or Z plane of an orthogonal XYZ coordinate system and a skewed plane that is skewed with respect to the orthogonal XYZ coordinate system;

outermost contour line extracting means for extracting outermost contour lines for each figure occurring at the reference planes allotted to the figures;

said outermost contour line extracting means including:
a figure projecting unit projecting the CAD data onto at least one of the reference planes;

a maximum/minimum operation unit for calculating maximum and minimum coordinate values that the projected figure can take;

line segment operating unit for generating a line segment linking the maximum and minimum coordinate values for each reference plane;

a plane generating unit for generating a plurality of planes perpendicular to each line segment;

a crosspoint extracting unit for obtaining crosspoints of generated planes and the projected figure on the reference planes; and outermost contour making unit for making a single contour line by linking the crosspoints with straight lines;

solid element making means for making solid elements for shapes extended in directions normal to the reference planes corresponding to the extracted outermost contour lines; and solid element synthesizing means for synthesizing the plurality of solid elements to construct three-dimensional CAD data.

2. The three-dimensional CAD system of claim 1, said figure allotting means allotting figure data from the read-out two-dimensional CAD data corresponding to reference drawings to specific planes, said figure allotting means allotting remaining figure data to corresponding reference planes by taking figure data corresponding to the reference drawings as a reference.

3. A method of converting two-dimensional CAD drawings to three-dimensional CAD drawings, comprising the steps of:

allotting a plurality of figures to at least two reference planes from two-dimensional CAD data, wherein the at least two reference planes include a parallel plane parallel to an X, Y, or Z plane of an orthogonal XYZ coordinate system and a skewed plane that is skewed with respect to the orthogonal XYZ coordinate system;

extracting an outermost contour line by projecting the CAD data onto at least one of the reference planes; calculating maximum and minimum coordinate values that the projected figure can take; generating a line segment linking the maximum and minimum coordinate values for each reference plane; generating a plurality of planes perpendicular to each line segment; obtaining crosspoints of generated planes and the projected figure on the reference planes; and making a single contour line by linking the crosspoints with straight lines;

making solid elements from shapes that are extended in the direction of a normal of a reference plane corresponding to an outermost contour line of each figure occurring at the reference planes that the figures are allotted to; and synthesizing the plurality of solid elements made in said making step to construct three-dimensional CAD data.

4. A method of converting two-dimensional CAD drawings to three-dimensional CAD drawings comprising the steps of:

reading two-dimensional CAD data;

allocating a plurality of figures to at least two reference planes from read-in two-dimensional CAD data, wherein the at least two reference planes include a parallel plane parallel to an X, Y, or Z plane of an orthogonal XYZ coordinate system and a skewed plane that is skewed with respect to the orthogonal XYZ coordinate system;

extracting outermost contour lines for each figure occurring at the reference planes allocated to the figures by projecting the CAD data onto at least one of the reference planes; calculating maximum and minimum coordinate values that the projected figure can take; generating a line segment linking the maximum and minimum coordinate values for each reference plane; generating a plurality of planes perpendicular to each line segment; obtaining crosspoints of generated planes and the projected figure on the reference planes; and making a single contour line by linking the crosspoints with straight lines;

making solid elements for shapes extended in directions normal to the reference planes corresponding to the extracted outermost contour lines; and synthesizing the plurality of solid elements to construct three-dimensional CAD data.

5. The method of converting two-dimensional CAD drawings to three-dimensional CAD drawings according to claim 4, said figure allocating step allocating figure data from the read-out tow-dimensional CAD data corresponding to reference drawings to specific planes, and said figure allocating step allocating remaining figure data to corresponding reference planes by taking figure data corresponding to the reference drawings as a reference.

6. An article of manufacture, comprising:

a computer-usable medium including computer-readable program code means, embodied therein, for causing a computer to perform a method of converting two-dimensional CAD drawings to three-dimensional CAD drawings, the computer-readable program code means comprising:

computer-readable program code means for reading two-dimensional CAD data;

computer-readable program code means for allocating a plurality of figures to at least two reference planes from read-in two-dimensional CAD data, wherein the at least two reference planes include a parallel plane parallel to an X, Y, or Z plane of an orthogonal XYZ coordinate system and a skewed plane that is skewed with respect to the orthogonal XYZ coordinate system;

computer-readable program code means for extracting outermost contour lines for each figure occurring at the reference planes allocated to the figures based on maximum and minimum coordinate values for each figure by projecting the CAD data onto at least one of the reference planes; calculating maximum and minimum coordinate values that the projected figure can take; generating a line segment linking the maximum and minimum coordinate values for each reference plane; generating a plurality of planes perpendicular to each line segment; obtaining crosspoints of generated planes and the projected figure on the reference planes; and making a single contour line by linking the crosspoints with straight lines;

computer-readable program code means for making solid elements for shapes extended in directions normal to the reference planes corresponding to the extracted outermost contour lines; and computer-readable program code means for synthesizing the plurality of solid elements to construct three-dimensional CAD data.

7. The article of manufacture according to claim 6, said computer-readable program code means for allocating figure allocating figure data from the read-out two-dimensional CAD data corresponding to reference drawings to specific planes, and said computer-readable program code means for allocating figure data allocating remaining figure data to corresponding reference planes by taking figure data corresponding to the reference drawings as a reference.

* * * * *